(12) United States Patent
Howell et al.

(10) Patent No.: US 12,064,772 B2
(45) Date of Patent: Aug. 20, 2024

(54) BIOCHEMICAL REACTION SYSTEM

(71) Applicant: IT-IS INTERNATIONAL LIMITED, Middlesbrough (GB)

(72) Inventors: James Richard Howell, Yarm (GB); Benjamin Masterman Webster, Cleveland (GB)

(73) Assignee: IT-IS International Limited, Middlesbrough (GB)

( * ) Notice: Subject to any disclaimer, the term of this patent is extended or adjusted under 35 U.S.C. 154(b) by 639 days.

(21) Appl. No.: 17/176,019

(22) Filed: Feb. 15, 2021

(65) Prior Publication Data
US 2021/0162419 A1 Jun. 3, 2021

Related U.S. Application Data

(62) Division of application No. 15/301,765, filed as application No. PCT/GB2015/051067 on Apr. 7, 2015, now Pat. No. 10,919,042.

(51) Int. Cl.
*B01L 7/00* (2006.01)
*B01L 9/06* (2006.01)
(Continued)

(52) U.S. Cl.
CPC ............... *B01L 7/52* (2013.01); *B01L 9/06* (2013.01); *G01N 21/0332* (2013.01);
(Continued)

(58) Field of Classification Search
CPC .... B01L 7/52; B01L 2300/0654; G01N 21/01
See application file for complete search history.

(56) References Cited

U.S. PATENT DOCUMENTS 5,552,580 A 9/1996 Pfost et al.
5,616,301 A 4/1997 Moser et al.
(Continued)

FOREIGN PATENT DOCUMENTS

EP 2353722 8/2011
GB 2526520 2/2015
(Continued)

OTHER PUBLICATIONS

European Search Report for EP Application No. 22156886.8, dated May 17, 2022 (9-pages).
(Continued)

*Primary Examiner* — Jonathan M Hurst
(74) *Attorney, Agent, or Firm* — Hartman Global IP Law; Gary M. Hartman; Domenica N. S. Hartman

(57) ABSTRACT

A chemical and/or biochemical apparatus (10) includes a thermal mount (14) having wells (26) for receiving reaction vessels (12), a thermal module (16) having a first side thermally coupled to the thermal mount (14), a first heat sink (18) thermally coupled to a second side of the thermal module, the heat sink (18) having a body and thermally conductive fins (32) extending outwards from the body of the first heat sink (18), and a printed circuit board (54) having electronic components for controlling at least the thermal module (16), an excitation light source (62), and a light sensor (52). A first set of light waveguides (60) delivers excitation light to a reaction vessel, and a second set of light waveguides (38) receives light from a reaction vessel and delivers the light to the light sensor (52). The printed circuit board (54), the excitation light source (62), the light sensor (52) and the light waveguides (38, 60) are arranged within an interior space (5) of the first heat sink (18).

17 Claims, 6 Drawing Sheets

(51) Int. Cl.
*G01N 21/03* (2006.01)
*G01N 21/27* (2006.01)

(52) U.S. Cl.
CPC ........ *G01N 21/272* (2013.01); *B01L 2300/02* (2013.01); *B01L 2300/041* (2013.01); *B01L 2300/0654* (2013.01); *B01L 2300/0663* (2013.01); *B01L 2300/0681* (2013.01); *B01L 2300/0832* (2013.01); *B01L 2300/087* (2013.01); *B01L 2300/123* (2013.01); *B01L 2300/1805* (2013.01); *B01L 2300/1822* (2013.01); *B01L 2300/1827* (2013.01); *G01N 2201/0231* (2013.01); *G01N 2201/0846* (2013.01)

(56) References Cited

U.S. PATENT DOCUMENTS

| | | | |
|---|---|---|---|
| 6,556,940 | B1 | 4/2003 | Tretiakov et al. |
| 2005/0123457 | A1 | 6/2005 | Tajima et al. |
| 2005/0145273 | A1 | 7/2005 | Atwood et al. |
| 2006/0101830 | A1 | 5/2006 | Cohen et al. |
| 2010/0112683 | A2 | 5/2010 | Atwood et al. |
| 2011/0039305 | A1* | 2/2011 | Termaat .................... B01L 7/52 435/303.1 |
| 2012/0270308 | A1 | 10/2012 | Bechmann et al. |
| 2012/0295249 | A1* | 11/2012 | Cherubini ............ G01N 35/028 435/6.12 |
| 2012/0308990 | A1* | 12/2012 | TerMaat .................... B01L 7/52 435/3 |
| 2013/0084606 | A1 | 4/2013 | Sugimoto et al. |
| 2014/0005078 | A1 | 1/2014 | Howell et al. |
| 2014/0038192 | A1 | 2/2014 | Buse et al. |
| 2016/0202184 | A1* | 7/2016 | Kreifels ................ C12Q 1/686 435/287.2 |

FOREIGN PATENT DOCUMENTS

| | | |
|---|---|---|
| JP | S63298137 | 12/1988 |
| JP | 2005077260 | 3/2005 |
| WO | 2004024330 | 3/2004 |

OTHER PUBLICATIONS

Combined Search and Examination Report for Application No. GB2107480.2, dated Jun. 29, 2021, (3 pages).
Combined Search and Examination Report for Application No. GB2107481.0, dated Jun. 14, 2021, (3 pages).
Examination Report for Application No. GB2107480.2, dated Jun. 14, 2021, (2-pages).
Combined Search and Examination Report for International Application No. GB2104363.3, dated May 12, 2021, (pp. 5).

* cited by examiner

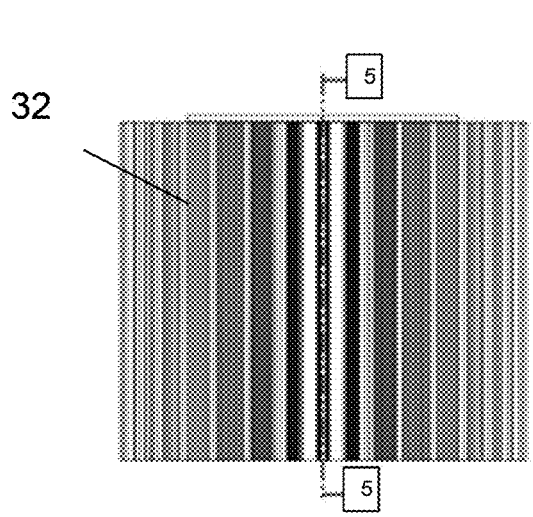
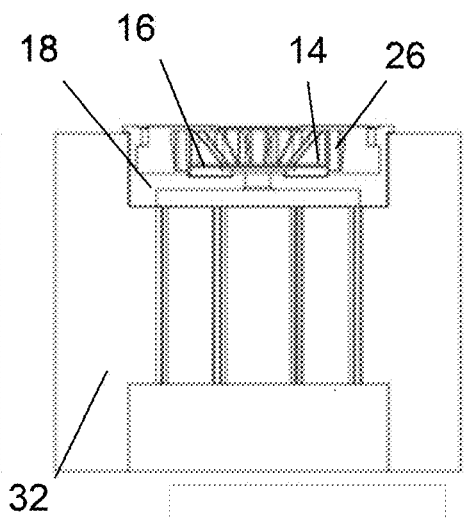
FIG. 4     FIG. 5
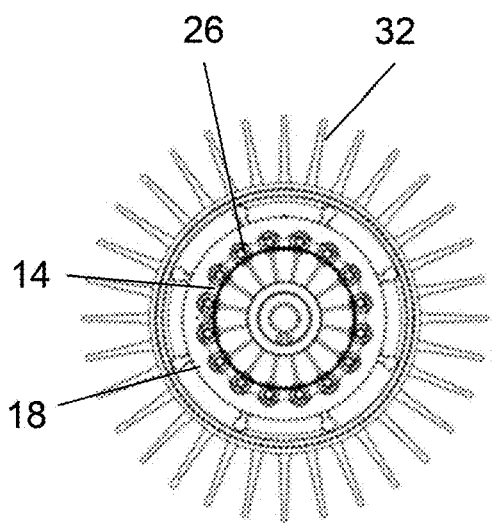
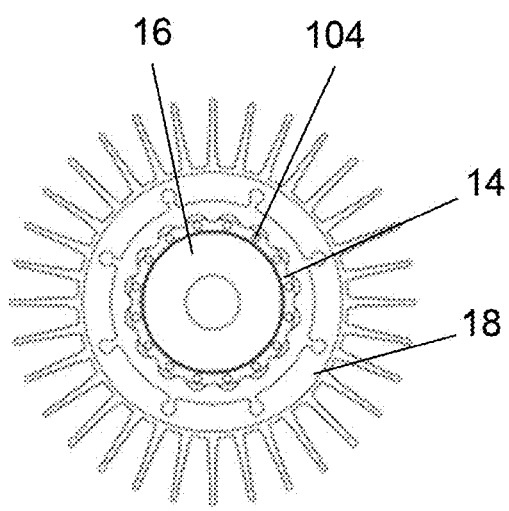
FIG. 6     FIG. 7

BIOCHEMICAL REACTION SYSTEM

CROSS-REFERENCE TO RELATED APPLICATIONS

This is a divisional patent application of co-pending U.S. patent application Ser. No. 15/301,765 filed Oct. 4, 2016. The contents of this prior patent document are incorporated herein by reference.

BACKGROUND OF THE INVENTION

The present invention relates to improvements in systems for chemical and/or biochemical reactions, such as, Polymerase Chain Reactions (PCR).

Many chemical and biochemical reactions are carried out which require highly accurately controlled temperature variations. Often, such reactions may need to go through several, or even many, cycles of varying temperature in order to produce the required effects. Furthermore, many such chemical and biochemical reactions are carried out which produce a detectable light signal, such as a fluorescent, chemiluminescent or bioluminescent signal, which occurs or is modified under certain reaction conditions. Such signals may emanate due to the reagents or results of the reaction(s) emitting light under certain conditions, for example due to excitation energy being applied, or may emanate by being generated by the reaction itself.

Detection of these light signals may be used in a variety of ways. In particular they can allow for the detection of the occurrence of a reaction, which may be indicative of the presence or absence of a particular reagent in a test sample, or to provide information about the progress or kinetics of a particular reaction. Although the term "light" is generally used to include visible light, it will be appreciated that optical signals that can emanate from reactions and be detected may also occur in the infra-red and/or ultra-violet portions of the spectrum and it is intended that the term "light" encompass all optical signals that can emanate from reactions of whatever wavelength that can be detected.

Of course, precise fluorescent measurements rely on precise excitation light sources. This, in turn, relies on the excitation light source or sources being carefully controlled, but also on the light coupling from the or each source to the reaction vessel being properly controlled to be uniform and controlled in intensity and wavelength. In known systems, such source control of the source(s) and coupling to the reaction vessel is missing.

A particular example of a reaction where a relatively large number of highly accurately controlled temperature varying cycles are required and where detectable signals and in particular fluorescent signals are monitored is in nucleic acid amplification techniques and in particular the polymerase chain reaction (PCR). Amplification of DNA by polymerase chain reaction (PCR) is a technique fundamental to molecular biology. PCR is a widely used and effective technique for detecting the presence of specific nucleic acids within a sample, even where the relative amounts of the target nucleic acid are low. Thus, it is useful in a wide variety of fields, including diagnostics and detection as well as in research.

Nucleic acid analysis by PCR requires sample preparation, amplification, and product analysis. Although these steps are usually performed sequentially, amplification and analysis can occur simultaneously.

In the course of the PCR, a specific target nucleic acid is amplified by a series of reiterations of a cycle of steps in which nucleic acids present in the reaction mixture are denatured at relatively high temperatures, for example at 95° C. (denaturation), then the reaction mixture is cooled to a temperature at which short oligonucleotide primers bind to the single stranded target nucleic acid, for example at 55° C. (annealing). Thereafter, the primers are extended using a polymerase enzyme, for example at 72° C. (extension), so that the original nucleic acid sequence has been replicated. Repeated cycles of denaturation, annealing and extension result in the exponential increase in the amount of target nucleic acid present in the sample. Variations of this thermal profile are possible, for example by cycling between denaturation and annealing temperatures only, or by modifying one or more of the temperatures from cycle to cycle.

Many such chemical or biochemical reactions take place in an apparatus having a number, sometimes a large number, of receptacles arranged in an array. In order not to affect the reaction, the receptacles are often formed from polypropylene as an array of wells in a plate. The wells are inserted into a metal mount which is thermally controlled so that the wells are thermally controlled by thermal conductivity through the walls of the wells. Various ways of providing the required thermal control are known. One of the most common is by the use of thermoelectric modules, such as Peltier modules, that can be used to provide heating or cooling (depending on the direction of current flow through the module). Although Peltier modules are well known and will not be described in detail here, it should be noted that a Peltier module essentially consists of a pair of ceramic, thermally conductive plates, between which semiconductors are mounted successively, to form p-n- and n-p-junctions. Each junction has a thermal contact with thermally conductive plates. When switching on a current of one polarity, a temperature difference is formed between the thermally conductive plates: one of them heats up and operates as a heat sink, the other cools down and operates as a refrigerator.

However, Peltier modules provide a number of disadvantages when used for accurate, repetitive thermal cycling because they are not designed, in the first instance, for such thermal cycling. Firstly, because the Peltier module is itself thermally conductive, there is a loss of power through the device. Secondly, current reversal causes dopant migration across the semiconductor junction, which is not symmetrical, hence the junction effectively loses its function as a junction between different semiconductors over time. Furthermore, repetitive temperature changes cause repetitive expansion and contraction cycles, which are not in themselves symmetric in a Peltier module. Since the Peltier module is in thermal contact with the thermal mount holding the wells and is itself often formed with different metals, which expand/contract at different rates, mechanical problems develop. These are sometimes mitigated by mechanically clamping the modules at high pressures, for example by using bolts that extend from the thermal mount having the wells, through the Peltier module and into the heat sink, but the mechanical problems still exist. Furthermore, the bolts themselves form a thermal path that can adversely affect the accurate control of the thermal cycling. This is also true of the wires that are used to electrically connect a power source to the Peltier module. Because the Peltier module requires quite high power during the ramping up and down of the temperature, a large power source is needed, and consequently large (thick) wires have been used to connect the power source to the Peltier module. These wires have also provided uncontrolled thermal paths to/from the Peltier module. Of course, the temperatures of the edges of the Peltier module are also far less controllable because of the fact that they are surrounded by uncontrolled ambient air, which may vary in its temperature and other characteristics. Finally, due to the nature of the operation of the Peltier module, hot and cold spots form on the surfaces thereof, which can be mitigated by attachment to a massive, thermally conductive heat sink, often made of aluminium, copper or silver, and/or to a massive thermally conductive mount, usually made of aluminium or copper, to average the heating, which again provide more mechanical problems.

BRIEF SUMMARY OF THE INVENTION

It is therefore an objective to provide improvements to chemical and/or biochemical systems to overcome, or at least reduce, some of the above problems. The reaction may be a Polymerase Chain Reaction or other types of chemical reactions such as, for example, Ligase Chain Reaction, Nucleic Acid Sequence Based Amplification, Rolling Circle Amplification, Strand Displacement Amplification, Helicase-Dependent Amplification, or Transcription Mediated Amplification.

Accordingly, some aspects of the invention may include:
1. chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels, the plurality of wells being arranged in one or more concentric regular convex polygons having five or more sides, or in one or more concentric circles; and
      a thermal module thermally coupled to the thermal mount for thermally controlling the thermal mount; or
2. a chemical and/or biochemical apparatus for receiving a plurality of reaction vessels in which chemical and/or biochemical reactions may take place, the apparatus comprising:
 a thermal mount of a thermally conductive material, the thermal mount having a plurality of wells for receiving the reaction vessels;
 a thermal module thermally coupled to the thermal mount for thermally controlling the thermal mount; and
 a lid having a laminar structure comprising an outer cover, an inner thermally conductive layer for contacting a top seal of the reaction vessels when they are positioned in the plurality of vessels and the lid is in a closed position, and a compressible layer arranged between the inner thermally conductive layer and the outer cover to bias the inner thermally conductive layer against the top seals of the reaction vessels when the lid is in the closed position, the lid further comprising one or more heating elements for heating the inner thermally conductive layer, and a locking structure for locking the removable lid in the closed position; or
3. a chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels;
      a thermal module thermally coupled to the thermal mount for thermally controlling the thermal mount; and a single printed circuit board comprising electronic components for controlling at least the thermal module, the single printed circuit board being thermally insulated from the thermal module; or
4. a chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels;
    a thermal module thermally coupled to the thermal mount for thermally controlling the thermal mount;
    at least one excitation light source coupled to deliver excitation light to the plurality of reaction vessels when they are positioned in respective wells;
    at least one light sensor coupled to receive light from the plurality of reaction vessels when they are positioned in respective wells; and
      a single printed circuit board comprising electronic components for controlling at least two of the thermal module, the at least one excitation light source and the at least one light sensor; or
5. a chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels; and
    a thermal module thermally coupled to the thermal mount for thermally controlling the thermal mount;
    wherein a vertical axis of at least one of said wells does not intersect with said thermal module; or
6. a chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels;
      a thermal module thermally coupled to the thermal mount for thermally controlling the thermal mount; and
      a plurality of light waveguides, each having a first end for receiving light from a respective reaction vessel when it is positioned in a respective well and a second end for delivering the light to at least one light sensor, wherein each of the light waveguides comprises at least two light waveguides coupled in series with an optical filter in a light path between them; or
7. a chemical and/or biochemical apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels;
    a thermal module thermally coupled to the thermal mount for thermally controlling the thermal mount; and
    means for providing a visual and/or aural indication of a status of the apparatus to a user; or 8. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount;
      a lid comprising an outer cover, an inner thermally conductive layer for contacting a top seal of the reaction vessels when they are positioned in the plurality of wells and the lid is in a closed position, one or more heating elements for heating the inner thermally conductive layer, and a locking structure for locking the removable lid in the closed position;
   a printed circuit board comprising electronic components for controlling at least the thermal module and the one or more heating elements; and
   a tri-axial connection coupled between the printed circuit board and the lid, wherein the tri-axial connection comprises a tri-axial connector for connection to the printed circuit board, and a corresponding tri-axial connector for connection to the lid; or
9. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount; and
      a fully removable lid comprising an outer cover, an inner thermally conductive layer for contacting a top seal of the reaction vessels when they are positioned in the plurality of wells and the lid is in a closed position, one or more heating elements for heating the inner thermally conductive layer, and a locking structure for locking the removable lid in the closed position; or
10. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount;
      a replaceable lid comprising an outer cover, an inner thermally conductive layer for contacting a top seal of the reaction vessels when they are positioned in the plurality of wells and the lid is in a closed position, one or more heating elements for heating the inner thermally conductive layer, a locking structure for locking the removable lid in the closed position, and non-volatile data storage;
   a printed circuit board comprising electronic components for controlling at least the thermal module and the one or more heating elements; and
   wherein the non-volatile data storage is used to store data that is used to identify whether the lid is of a known and supported type, and the one or more heating elements are only enabled if the lid is identified as being of a known and supported type; or
11. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount;
      a lid comprising an outer cover, an inner thermally conductive layer for contacting a top seal of the reaction vessels when they are positioned in the plurality of wells and the lid is in a closed position, one or more heating elements for heating the inner thermally conductive layer, a locking structure for locking the removable lid in the closed position, and a temperature sensor for sensing a temperature adjacent the inner thermally conductive layer;
   a printed circuit board comprising electronic components for controlling at least the thermal module and the one or more heating elements; and
   wherein the sensed temperature is used to control operation of the one or more heating elements; or
12. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount; and
      a lid comprising an outer cover, an inner thermally conductive layer for contacting a top seal of the reaction vessels when they are positioned in the plurality of wells and the lid is in a closed position, one or more heating elements for heating the inner thermally conductive layer, and a bayonet locking mechanism for locking the lid in the closed position;
13. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;
      a thermal module thermally coupled to the thermal mount for thermally controlling the thermal mount; and
      a printed circuit board comprising a single microcontroller for performing all control functions of the apparatus; or
14. a chemical and/or biochemical apparatus for receiving a plurality of reaction vessels in which chemical and/or biochemical reactions may take place, the apparatus comprising:
   a thermal mount of a thermally conductive material, the thermal mount having a plurality of wells for receiving the reaction vessels;

a thermal module comprising a first side thermally coupled to the thermal mount for thermally controlling the thermal mount, and an opposed second side;

a first heat sink thermally coupled to the second side of the thermal module, with a plurality of thermally conductive fins extending radially outwards from a central portion of the first heat sink;

a printed circuit board comprising electronic components for controlling at least the thermal module, the single printed circuit board being thermally insulated from the first heat sink; and a second heat sink thermally coupled to the single printed circuit board, with a plurality of thermally conductive fins extending radially outwards from a central portion of the second heat sink; or 15. a chemical and/or biochemical apparatus for receiving a plurality of reaction vessels in which chemical and/or biochemical reactions may take place, the apparatus comprising:

a thermal mount of a thermally conductive material, the thermal mount having a plurality of wells for receiving the reaction vessels;

a thermal module thermally coupled to the thermal mount for thermally controlling the thermal mount;

a printed circuit board comprising electronic components for controlling at least the thermal module;

wherein at least the thermal module and the thermal mount are configured with a central axial hollow structure; or 16. a chemical and/or biochemical apparatus for receiving a plurality of reaction vessels in which chemical and/or biochemical reactions may take place, the apparatus comprising:

a thermal mount of a thermally conductive material, the thermal mount having a plurality of wells for receiving the reaction vessels;

a thermal module thermally coupled to the thermal mount for thermally controlling the thermal mount; and a plurality of light waveguides, each having a first end for receiving light from a reaction vessel when it is positioned in a respective well and a second end for delivering the light to at least one light sensor, wherein the second ends of the light waveguides are mounted directly to the at least one light sensor; or 17. a chemical and/or biochemical apparatus for receiving a plurality of reaction vessels in which chemical and/or biochemical reactions may take place, the apparatus comprising:

a thermal mount of a thermally conductive material, the thermal mount having a plurality of wells for receiving the reaction vessels, a thermal module having a first side thermally coupled to the thermal mount and a second side;

a first heat sink thermally coupled to the second thermally conductive side of the thermoelectric module, the heat sink comprising a body and a plurality of thermally conductive fins extending outwards from the body of the first heat sink;

at least one printed circuit board comprising electronic components for controlling at least the thermal module, at least one excitation light source, and at least one light sensor, a first plurality of light waveguides, each having a first end for receiving excitation light from the at least one excitation light source and a second end for delivering the excitation light to a reaction vessel when it is positioned in a respective well; and a second plurality of light waveguides, each having a first end for receiving light from a reaction vessel when it is positioned in a respective well and a second end for delivering the light to the at least one light sensor;

wherein the first heat sink comprises an interior space at least partly defined by the plurality of thermally conductive fins, and wherein the printed circuit board, the excitation light source, the light sensor and the first plurality and the second plurality of light waveguides are arranged within the interior space; or 18. a chemical and/or biochemical apparatus for receiving a plurality of reaction vessels in which chemical and/or biochemical reactions may take place, the apparatus comprising:

a thermal mount of a thermally conductive material, the thermal mount having a plurality of wells for receiving the reaction vessels, the plurality of wells being arranged in one or more concentric regular convex polygons having five or more sides, or in one or more concentric circles;

a fully removable lid having a laminar structure comprising an outer cover, an inner thermally conductive layer for contacting a top seal of the reaction vessels when they are positioned in the plurality of vessels and the lid is in a closed position, and a compressible layer arranged between the inner thermally conductive layer and the outer cover to bias the inner thermally conductive layer against the top seals of the reaction vessels when the lid is in the closed position, the lid further comprising one or more heating elements for heating the inner thermally conductive layer, and a locking structure for locking the removable lid in the closed position;

a thermal module having a first side thermally coupled to the thermal mount and a second side;

a first heat sink thermally coupled to the second side of the thermoelectric module, with a plurality of thermally conductive fins extending radially outwards from a central portion of the first heat sink;

at least one printed circuit board comprising electronic components for controlling at least the thermal module and the heating elements of the removable lid, at least one excitation light source, and at least one light sensor, the printed circuit board being thermally insulated from the first heat sink;

a second heat sink thermally coupled to the printed circuit board, with a plurality of thermally conductive fins extending radially outwards from a central portion of the second heat sink;

a first plurality of light waveguides, each having a first end for receiving excitation light from the at least one excitation light source and a second end for delivering the excitation light to a reaction vessel when it is positioned in a respective well;

a second plurality of light waveguides, each having a first end for receiving light from a reaction vessel when it is positioned in a respective well and a second end for delivering the light to the at least one light sensor.

In various preferred features of one or more embodiments:
- the thermal module is any one of:
  - a thermoelectric module;
  - a resistive heater; or
  - a thermal heater with heating and cooling provided by liquid of different temperatures;
- the thermal mount and the thermoelectric module may each have a central axial aperture;
- the thermoelectric module may comprise a first side thermally coupled to the thermal mount and an opposed second thermally conductive side, and the apparatus further comprises a heat sink thermally coupled to the second thermally conductive side of the thermoelectric module;
- each of the light waveguides may comprise at least two light waveguides coupled in series with an optical filter in a light path between them;
- the optical filter may comprise a dichroic filter;
- each of the light waveguides of the second plurality may comprise at least two light waveguides coupled in series with a dichroic filter in a light path between them;
- a plurality of light waveguides may be provided, each having a first end for receiving light from a respective reaction vessel when it is positioned in a respective well and a second end for delivering the light to at least one light sensor;
- the thermal mount and the thermoelectric module may each have a central axial aperture through which the light waveguides pass;
- a rotatable electrical connection may be provided between the printed circuit board and the lid;
- the thermal mount, the thermoelectric module and the first heat sink may each have a central axial aperture through which at least the rotatable electrical connection passes;
- the rotatable connection may comprise a multi-pole rotatable connector with at least three poles;
- the multi-pole rotatable connector may comprise a connector with a pin and cylindrical contacts;
- the multi-pole rotatable connector may comprise a connector with stacked cylindrical contacts;
- the multi-pole rotatable connector may comprise a connector with more than three poles;
- the multi-pole rotatable connector may comprise a tri-axial connector for connected to the printed circuit board, a corresponding tri-axial connector connected to the lid;
- the rotatable connection may provide a power connection between the printed circuit board and the lid;
- the power connection may provide power to the one or more heating elements of the lid;
- the rotatable connection may provide a data connection between the printed circuit board and the lid;
- the data connection may include a data connection between the printed circuit board and at least one temperature sensor of the lid;
- the temperature sensor may be a one-wire sensor;
- the data connection may include a data connection between the printed circuit board and a sensor that determines whether the lid is in the closed position;
- the rotatable electrical connection may provide a power connection between the printed circuit board and a microcontroller in the lid and the data connection includes a data connection between the printed circuit board and the microcontroller;
- the microcontroller may be configured to perform one or more of:
  - regulating temperature of the lid by reading a temperature sensor and controlling the power connection providing power to the one or more heating elements of the lid;
  - controlling one or more display elements in the lid, which display elements comprise one or more of display LEDs, LCD display, OLED display; and e-paper display;
  - reading a status of one or more human input devices such as buttons or keypads on the lid;
  - providing an interface to additional connectors in the lid, for example USB or SD card connectors; and
  - providing an interface to wireless communications electronics in the lid, for example WiFi, bluetooth, or bluetooth low energy;
- the data connection may include a data connection between the printed circuit board and at least one 1-wire slave device in the lid, the at least one 1-wire slave device being connected to the data connection and configured so that it can be parasitically powered by the data connection;
- the lid may include non-volatile data storage;
- the non-volatile data storage may be used to store data that is used to identify type, version, manufacturing date, revision and/or calibration data associated with the lid;
- the data may be used to identify whether the lid is of a known and supported type, and the power connection is only enabled if the lid is identified as being of a known and supported type;
- the data connection may be resistively pulled to a voltage, and the lid and the printed circuit board each include an electronic device having an open-drain output pin connected to the data connection, thereby allowing each electronic device to pull the data connection to ground to transmit data, and to sample the state of the data connection to receive data;
- at least one of the electronic devices may be a microcontroller;
- one or both microcontrollers may use(s) a standard UART peripheral configured to operate in open-drain mode to provide for transmission and reception of data;
- the at least one light sensor may comprise at least one colour sensor;
- the at least one light sensor may comprise at least one monochromatic sensor;
- each of the light waveguides may comprise at least two light waveguides with one or more filters movable into a light path between the at least two light waveguides;
- the one or more filters may be mounted on a filter wheel comprising a plurality of different filters;
- the one or more filters may be mounted on a filter slide comprising a plurality of different filters;
- a second plurality of light waveguides may be provided, each having a first end for receiving excitation light from at least one excitation light source and a second end for delivering the excitation light to a reaction vessel when it is positioned in a respective well;
- each of the light waveguides of the second plurality may comprise at least two light waveguides with one or more filters movable into a light path between the at least two light waveguides;
- the one or more filters may be mounted on a filter wheel comprising a plurality of different filters;
- the one or more filters may be mounted on a filter slide comprising a plurality of different filters;

a single filter wheel may be coupled such that when a first filter of the filter wheel is arranged between the waveguides of the plurality of light waveguides a predetermined second filter is arranged between the waveguides of the second plurality of light waveguides;

a plurality of different coloured LEDs may be mounted on the at least one printed circuit board and a light guiding structure configured to guide light from the LEDs to an outer perimeter of the apparatus to indicate a status of the apparatus;

an audio generator may be coupled to the at least one printed circuit board and configured to generate one or more audio notifications to indicate a status of the apparatus;

the audio notifications may comprise sounds and/or speech;

at least a main body of one or more of the thermal mount and the thermoelectric module may have an order of rotational symmetry of five or more;

at least a main body of one or more of the thermal mount, the thermoelectric module, and the lid may have an order of rotational symmetry of five or more;

at least a main body of one or more of the thermal mount, the thermoelectric module, and the printed circuit board may have an order of rotational symmetry of five or more;

at least an outer perimeter of one or more of the thermal mount and the thermoelectric module may have a shape comprising a regular convex polygon having five or more sides, or a circle;

at least an outer perimeter of one or more of the thermal mount, the thermoelectric module, and the lid may have a shape comprising a regular convex polygon having five or more sides, or a circle;

at least an outer perimeter of one or more of the thermal mount, the thermoelectric module, and the printed circuit board may have a shape comprising a regular convex polygon having five or more sides, or a circle;

one or more of the thermal mount and the thermoelectric module may be annular;

one or more of the at least one printed circuit board and the fully removable lid may be circular;

one or more of the first heat sink and the second heat sink may be extruded;

the locking structure for locking the removable lid in the closed position may comprise a bayonet lock mechanism;

the lid may be positionable into the closed position in a direction to contact all the top seals of the reaction vessels when they are positioned in the plurality of vessels substantially simultaneously;

the printed circuit board may comprise a single microcontroller for performing all control functions of the apparatus;

the thermal mount may overhang the thermoelectric module;

the thermal mount may comprise ribs extending from the wells of the thermal mount for thermal coupling to the thermoelectric module;

the thermal mount may be annular with a central aperture and may comprise sixteen wells extending in a circle around the central aperture;

one or more of a flexible, thermally conductive adhesive, graphite, a thermal paste and a thermally conducting conformal layer may be arranged between the thermoelectric module and the thermal mount;

the lid may have a laminar structure including a compressible layer arranged between the inner thermally conductive layer and the outer cover to bias the inner thermally conductive layer against the top seals of the reaction vessels when the lid is in the closed position;

the compressible layer of the lid may be a foam;

the printed circuit board may be thermally insulated from the first heat sink by an annular insulating layer arranged between an outer perimeter of the printed circuit board and the first heat sink;

one or more of a flexible, thermally conductive adhesive, graphite, a thermal paste and a thermally conducting conformal layer may be arranged between the printed circuit board and the second heat sink;

an excitation light control system may further be provided, the excitation light control system comprising an excitation light sensor providing an electronic digital frequency output proportional to an intensity of excitation light incident on the excitation light sensor, wherein the excitation light incident on the excitation light sensor comprises a portion of the excitation light emitted from the at least one excitation light source, the electronic digital frequency output of the excitation light sensor being connected to an input of a microcontroller, and wherein an output of the microcontroller is connected to the excitation light source, the excitation light source being gated by the state of the output, such that the microcontroller may set the output state to enable or disable the production of excitation light by the excitation light source, and hence provide pulses of excitation light containing a repeatable total amount of excitation light;

the electronic digital frequency output of the excitation light sensor may comprise pulses and the microcontroller may be configured to count the pulses produced by the excitation light sensor, and to disable the excitation light source after a desired number of pulses;

the printed circuit board may be substantially thermally insulated from the first heat sink;

there may be only a single printed circuit board or the printed circuit board may comprise two or more printed circuit boards;

a second heat sink may be thermally coupled to the printed circuit board, the second heat sink having a plurality of thermally conductive fins extending outwards from a central portion of the second heat sink;

the second heat sink may form a boundary (for example a lower boundary) of the interior space;

the interior space may comprise an upper boundary defined by the body of the first heat sink and one or more side boundaries defined by the thermally conductive fins of the first heat sink and, in some cases, of the second heat sink;

the body and the upper parts of the fins of the upper heat sink may define a second interior space, wherein the thermal mount and thermoelectric module are located within the second interior space;

all functional components (other than a power cable and the functions of the lid) of the apparatus may be located within a lateral perimeter of the apparatus defined by the outer edges of the fins of the first heat sink and, in some cases, the second heat sink, and within a top perimeter defined by upper edges of the fins of the first heat sink and, in some cases, a bottom perimeter defined by lower edges of the fins of the second heat sink.

Another aspect may include a light control system comprising a light sensor providing an electronic digital frequency output proportional to an intensity of light incident on the light sensor, wherein the light incident on the light sensor comprises a portion of total light output emitted from a light source, the electronic digital frequency output of the sensor being connected to an input of a microcontroller, and wherein an output of the microcontroller is connected to the light source that is gated by the state of the output, such that the microcontroller may set the output state to enable or disable the production of light by the light source, and hence provide pulses of light containing a repeatable total amount of light.

The electronic digital frequency output of the light sensor may comprise pulses and the microcontroller may be configured to count the pulses produced by the light sensor, and to disable the light source after a desired number of pulses.

It will be appreciated that any one or more of the features may be combined, as desired with any one or more of the various aspects of the invention, whether explicitly stated in combination or not.

BRIEF DESCRIPTION OF THE DRAWINGS

Embodiments of the invention will now be described in greater detail, by way of example only, with reference to the accompanying drawings, in which:

FIG. 4 shows a side view of a part of the apparatus of FIG. 1;

FIG. 5 shows a cross-section view on line 5-5 of FIG. 4;

FIG. 6 shows a top view of the part of the apparatus shown in FIG. 4;

FIG. 7 shows a bottom view of the part of the apparatus shown in FIG. 4;

DETAILED DESCRIPTION OF THE INVENTION

Figure 1:
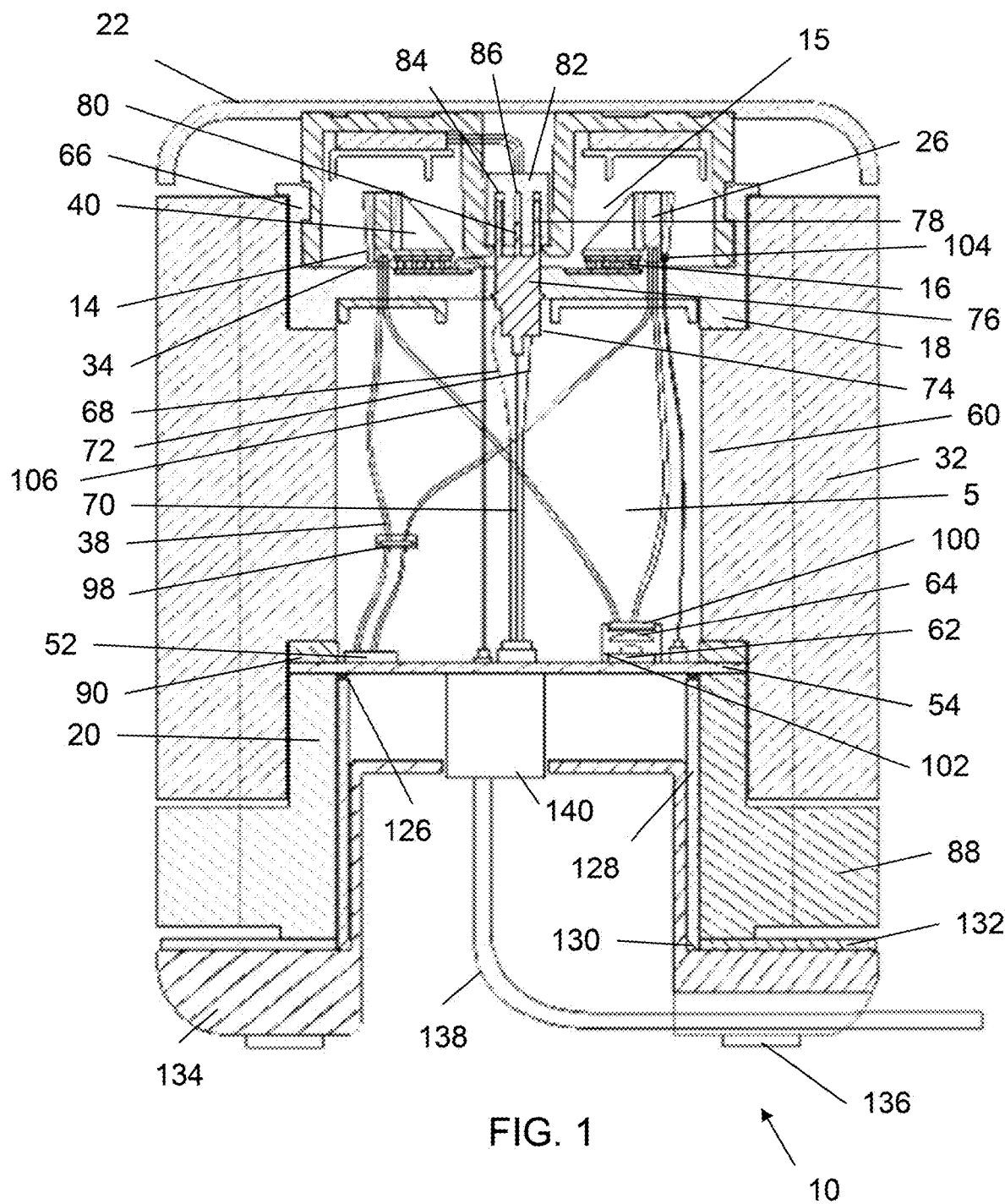
FIG. 1 shows a part cross-sectional view through a chemical and/or biochemical apparatus according to one embodiment of the invention illustrating a number of different aspects of the invention for receiving a plurality of reaction vessels in which PCT or other chemical and/or biochemical reactions may take place.
Figure 2:
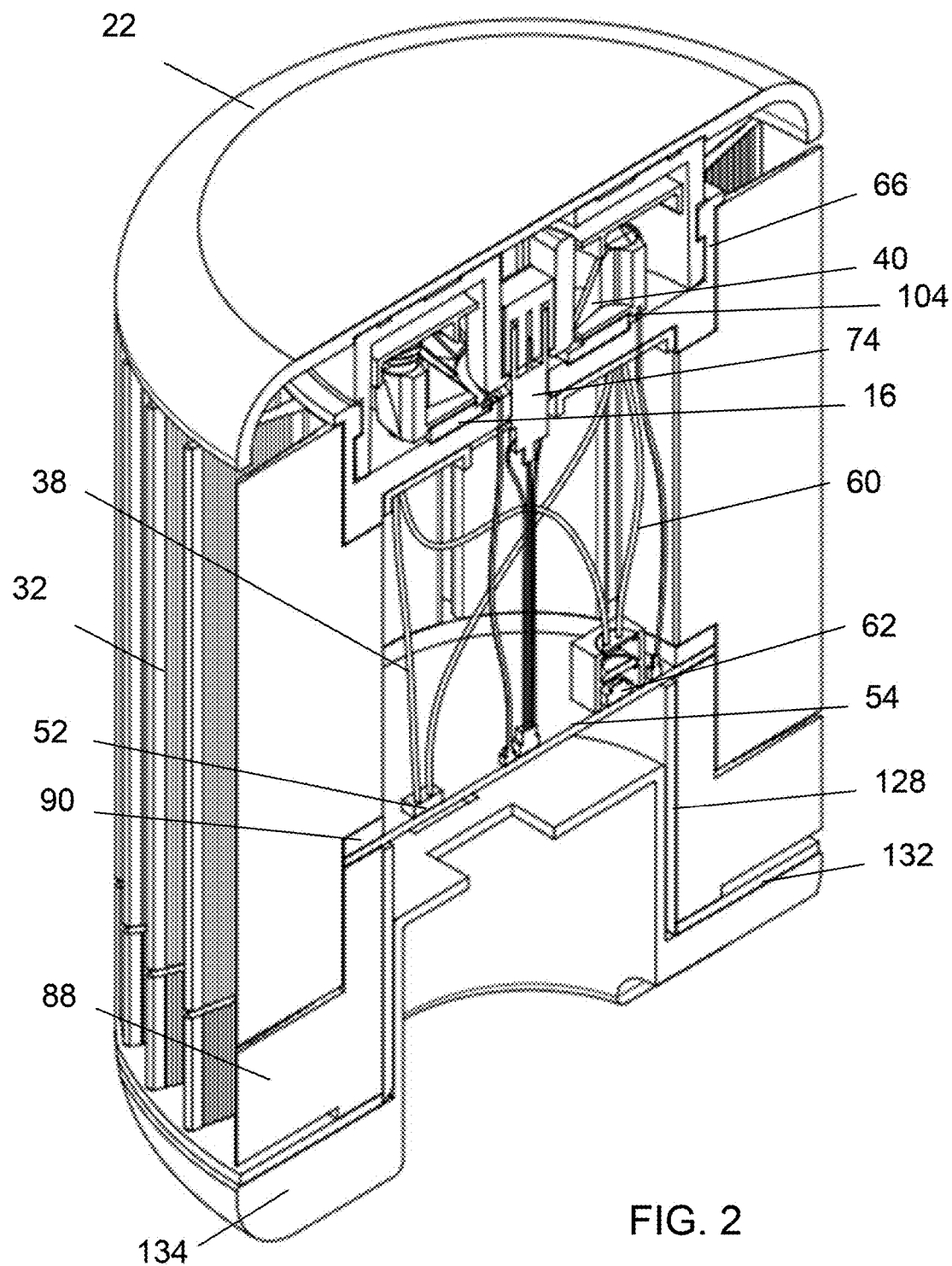
FIG. 2 shows a perspective, part cross-sectional view through the apparatus of FIG. 1, with a lid.

As will be apparent from the explanation above, for many chemical and biochemical reactions, the temperature of the reaction has a significant effect on the progress and results of the reaction, and so the accuracy and repeatability of thermal control are critical to producing accurate and repeatable results. In particular, the polymerase chain reaction requires the temperature to cycle between accurate temperatures to perform amplification, and deviations from these temperatures can produce a less efficient amplification, reduce the specificity of the amplification and produce unwanted reaction products, or in extreme cases prevent the reaction from proceeding, or denature the reagents. An important analysis technique often used with PCR is to subject the reaction products to a controlled temperature ramp, where the temperature slowly increases according to a controlled profile, while optical readings are taken to produce for each reaction one or more curves relating temperature to optical measurements. In order for the results derived from these curves to be accurate, the temperature of each well must be accurately known at the time of each optical measurement. As an example, the curve of fluorescence emitted from an intercalating dye can be measured against temperature. The fluorescence level indicates the quantity of double stranded DNA present, and so the temperature at which the fluorescence is decreasing most rapidly with increasing temperature is the "melt temperature" of the DNA present. This in turn gives information about the DNA sequence present.

It will therefore be apparent that it would be advantageous for a thermally controlled instrument to provide for each receptacle to be as near as possible to the same temperature at each time during a run, so as to provide good thermal uniformity across the receptacles. Existing instruments often use arrangements of receptacles where each receptacle has a different thermal environment. For example in a rectangular grid array, the receptacles at the edges of the array suffer from "edge effects" due to greater thermal connection to ambient air, the instrument enclosure, and other thermal paths that can produce a different temperature. In particular, Peltier elements suffer from such effects, as described above.

Accordingly, in one embodiment of the invention, the receptacles themselves, and the important thermal elements of the apparatus, are arranged in a rotationally symmetrical configuration, so that each receptacle can be provided with a thermally equivalent environment. As may be seen from the drawings, in such a rotationally symmetrical apparatus 10, each receptacle 12 has substantially the same thermal connection to elements such as the thermal mount 14, thermoelectric module 16, heat sinks 18 and 20, heated lid 22, etc, which significantly influence the temperature of each receptacle 12 during operation. Effectively, each receptacle 12 is still subject to edge effects, but by arranging for each receptacle 12 to be subject to the same edge effects, uniformity is preserved. A lower supporting structure 134 supports the rest of the apparatus and rests on feet 136.

In order to achieve this in an apparatus 10 using a thermoelectric module 16, such as a Peltier device, the device can be constructed so that its large-scale design is rotationally symmetrical. It is common for these devices to consist of an upper planar thermally conductive layer 24 for thermal coupling to the receptacles 12 or to the thermal mount 14 having wells 26 that will in turn contain the receptacles 12, a lower planar thermally conductive layer 28 for thermal coupling to a first heat sink 18, and a layer between these two coupling layers that contains the thermoelectric elements 30. These elements 30 commonly consist of multiple semiconducting elements 30 connected so as to form one or more circuits through which current may be passed to cause heat to be pumped from one coupling layer to the other, with the direction of pumping being determined by the direction of current.

Ideally, a thermoelectric module 16 for use in a rotationally symmetrical apparatus will have rotationally symmetrical thermal coupling layers 24, 28, and a rotationally symmetric arrangement of semiconducting elements 30. However in practice it may be necessary to use a non-rotationally symmetrical arrangement of semiconducting elements 30, for example to use an efficient regular arrangement such as a grid to pack the elements into the active area of the module 16. In this case the module 16 can still provide a substantially rotationally symmetrical heat pumping effect across a rotationally symmetrical active area, by filling this area as closely as possible with semiconducting elements, where the elements 30 are relatively small compared to the size of the receptacles 12.

Figure 3:
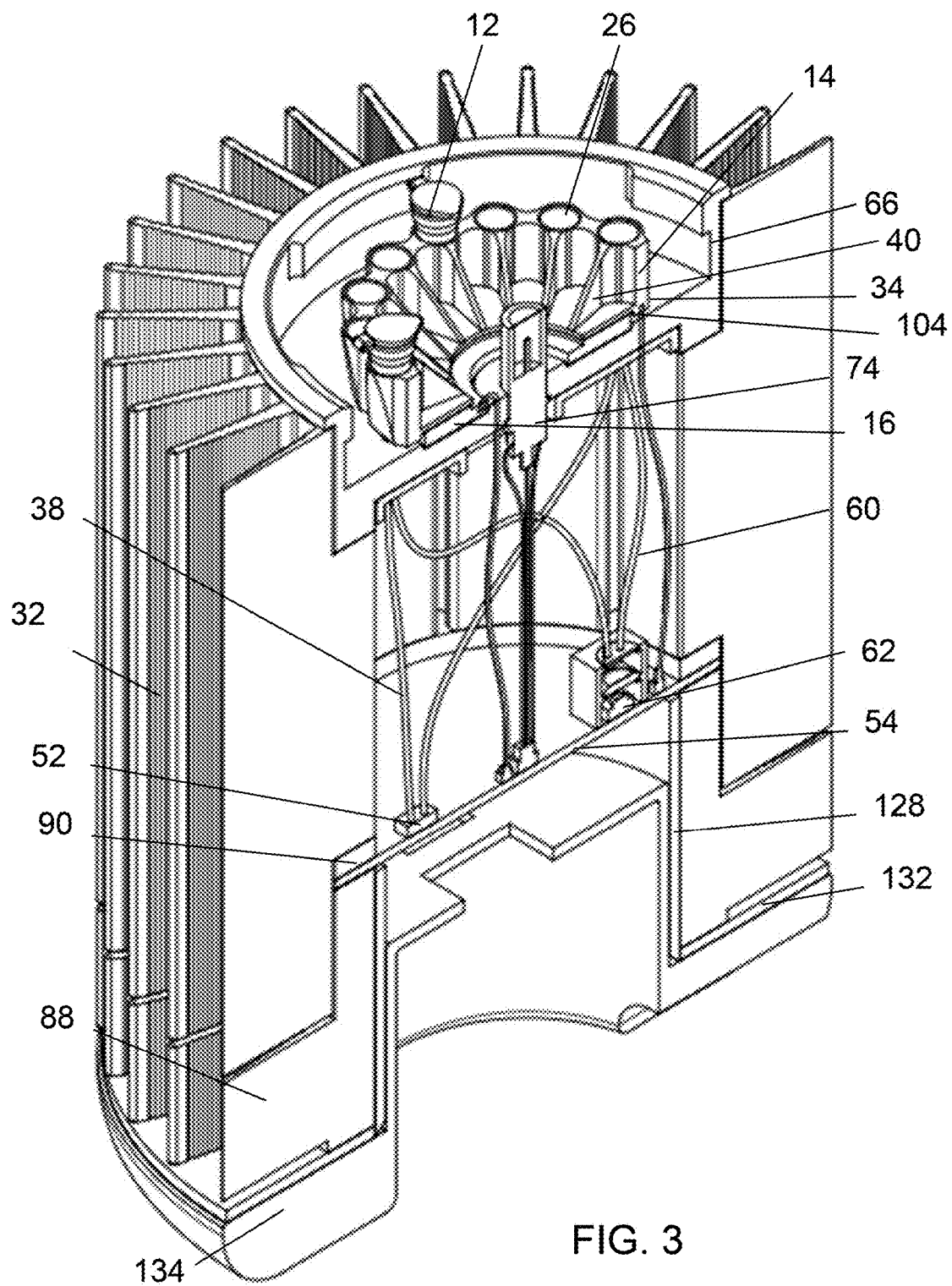
FIG. 3 shows a perspective, part cross-sectional view through the apparatus of FIG. 1, without the lid.
Figure 8:
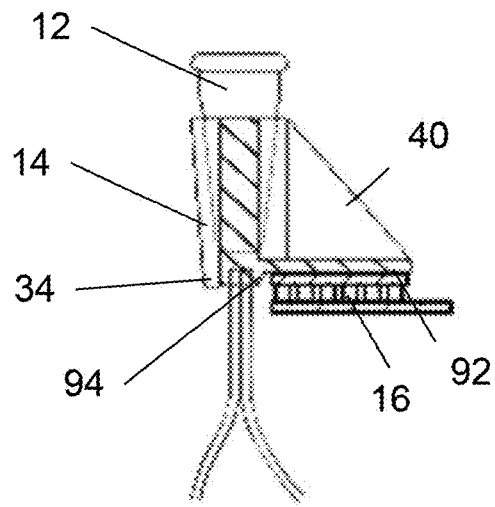
FIG. 8 shows an enlarged view of a portion of the apparatus of FIG. 1.
Figure 9:
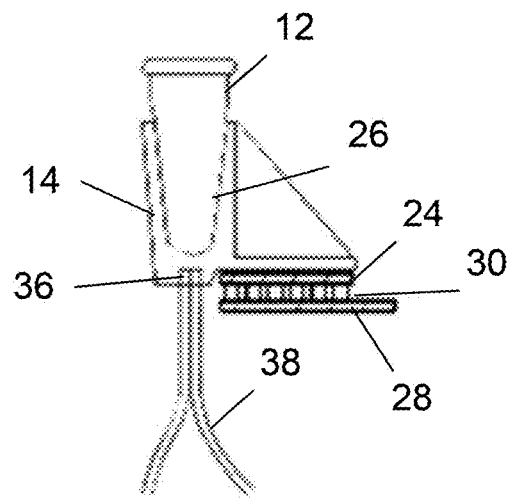
FIG. 9 shows an similar enlarged view of the portion of the apparatus of FIG. 8.
Figure 10:
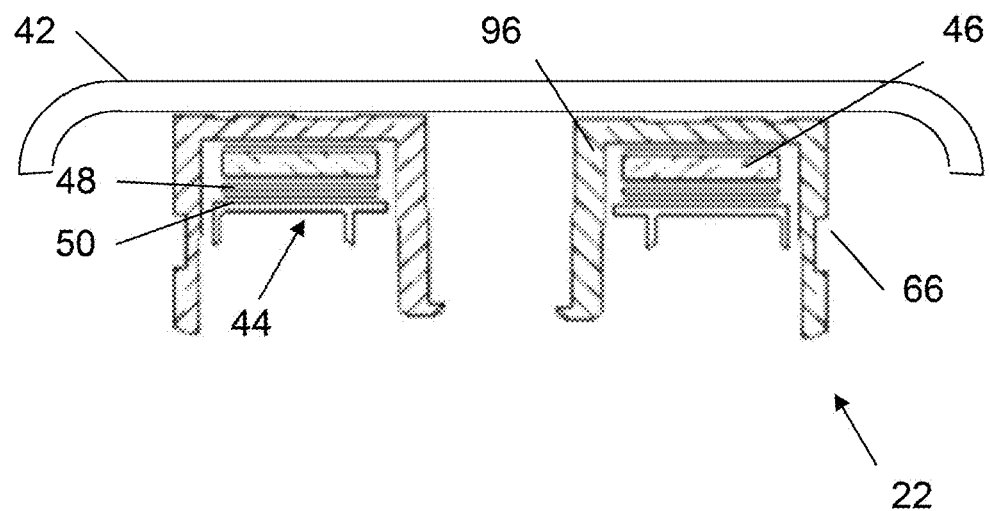
FIG. 10 shows an enlarged view of a lid of the apparatus of FIG. 1.

In providing a rotationally symmetric thermal environment for the receptacles 12, it is also advantageous, in one embodiment of the invention, to provide for the thermoelectric module 16 to be attached to a rotationally symmetric heat sink 18, for example a cylindrical heat sink with radial fins 32. Alternatively a circular heat sink could be provided with cylindrical projections (pins) underneath (sometimes referred to as a "pin heat sink"), arranged rotationally symmetrically. Such a pin heat sink could also be provided with pins arranged in a non-rotationally symmetrical manner, but still covering an active area that is substantially rotationally symmetrical.

Where receptacles 12 are inserted into wells 26 in a thermal mount 14, this mount 14 may also be rotationally symmetrical, for example, in one embodiment providing an arrangement of wells 26 at the vertices of a regular polygon or around one or more concentric circles (as best seen in FIG. 3), which can still provide for a conventional distance of 9 mm between receptacles. In particular the thermal coupling of the mount 14 to means of heating and cooling the mount such as a thermoelectric module 16 is preferably rotationally symmetrical.

In an embodiment of the invention, the thermal mount 16 provides wells 26 for commonly used receptacle tubes 12, for example polymer tubes commonly used for PCR and other biochemical reactions, often referred to as 0.2 mL tubes. In particular the wells 26 may be arranged at a commonly used spacing, for example at 9 mm center to center pitch. Such an arrangement may permit use of commonly used strips of 8 or 12 receptacle tubes 12, where the strips may be bent to insert the receptacle tubes 12 around the polygonal or circular arrangement of the wells 26 in the thermal mount 14. Alternatively, strips of receptacle tubes 12 may be manufactured for use in the apparatus 10 which are specifically designed to form part of a circumference of a circle having the required radius, or which are designed to be flexible to allow them to be either straight, for use in commonly available equipment having straight rows of wells, or bent to the correct radius for use in a polygonal or circular receptacle array. In a particular embodiment of an apparatus 10 with an even number of wells 26, an array of receptacle tubes 12 could be manufactured consisting of a regular array of receptacle tubes 12, where the receptacle tubes 12 are evenly spaced along two strips, and those strips are joined to each other at each end. Such an array could be placed in standard equipment when the strips are held straight so as to form a rectilinear array, but could then be bent by pressing on the points where the strips are joined so as to deform the strips into semicircles, so that both joined strips together form a circular arrangement suitable for placing in a circular array of wells 26 in the thermal mount 14.

An embodiment of the invention also provides for an accessory for the apparatus 10 consisting of a separate holder (not shown) comprising a plate with holes at positions and sizes corresponding to the wells in the apparatus, into which individual receptacle vessels can be inserted. The holder and vessels may then be inserted into the apparatus so that the vessels are inserted into the wells, and the holder fits into a void provided in the apparatus, allowing the apparatus to perform reactions without the need to remove the holder. This enables faster and easier loading of the instrument, and removes the chance of inadvertently rearranging single vessels or inserting them in an incorrect order into the instrument. Preferably, the holder is marked so as to indicate the required alignment of the holder in the instrument. Preferably the holder is formed with particular features that mate to corresponding features of the apparatus to enforce a particular rotational alignment of the holder, rendering it difficult or impossible to insert the holder and vessels in an incorrect alignment.

Where the thermal mount 14 is thermally coupled to a thermoelectric module 16, the thermal mount 14 and the thermoelectric module 16 are preferably formed with physical features such that the thermal mount 14 and the thermoelectric module 16 may only be mated together in a particular alignment. In particular, the surface of the thermal mount 14 that couples to the thermoelectric module 16 may be provided with an indented region corresponding to the shape of the coupling surface of the thermoelectric module 16. Preferably, the indented region has a flat surface 92, and the border of the region is formed with a chamfer 94, such that there is an angled wall around the region, and so that when the thermoelectric module 16 is coupled to the thermal mount 14, the angled wall prevents contact between the thermal mount 14 and the thermoelectric module 16 except over the flat mating region, in particular preventing significant thermal contact between the wall and the thermoelectric module 16, thus reducing thermal coupling outside the intended flat mating region.

Further, the thermoelectric module 16 may be provided with one or more flat regions on the circumference of a circular module, or the inner or outer circumference of an annular thermoelectric module 16, which are too small to significantly affect thermal performance, but are large enough to enforce rotational alignment to the indented coupling region of the thermal mount 14. In addition, the thermoelectric module 16 may be thermally coupled to the heat sink 18 using the same rotational alignment features.

An embodiment of the invention provides for a thermal mount 14 with a circular array of wells 26, thermally coupled to a circular or annular thermoelectric module 16, where an outer radius of the thermal mount 14 is greater than an outer radius of the thermoelectric module 16, so that a region 34 of the thermal mount 14 overhangs the thermoelectric module 16 and has holes 36 in the thermal mount 14 extending from the wells 26 through the overhanging region 34, permitting one or more light waveguides 38 per well 26 to pass through the thermal mount 14 and hence guide light to and/or from the corresponding vessels 12. Where the thermoelectric module 16 is annular, the overhanging region of the thermal mount 14 may overhang the thermoelectric module 16 inside an inner radius of the thermoelectric module 16 annulus, again providing for holes in the thermal mount 14 permitting light waveguides to be arranged adjacent the vessels 12.

In one particular embodiment, when the overhanging region 34 of the thermal mount 14 overhangs the outside radius of the thermoelectric module 16, the thermal mount 14 may provide vertical ribs 40 connecting a region of the thermal mount 14 adjacent to the wells 26 to a region of the thermal mount 14 adjacent to the thermoelectric module 16, so as to provide thermal coupling between the regions, as well as increased mechanical rigidity, while having a lower mass than a solid mount. This lower mass provides for faster variations of temperature in the thermal mount 14 using the same power, or lower power requirements, or both, as well as reducing material costs.

It will be clear that there are other means of providing for the rotationally symmetrical thermal environment described, by use of rotationally symmetrical designs with other known thermal elements. In addition, it may be necessary to provide for features of the instrument which are not rotationally symmetrical, but which do not substantially affect the thermal environment of the vessels 12, and so preserve the advantages of this embodiment of the invention, for example elements which are present for mechanical purposes such as fixings, fastenings, outer enclosures etc.

Receptacle vessels 12 used for chemical and biochemical reactions often consist of a lower portion which is inserted into a well in the mount which regulates the temperature of the reaction, and an upper portion which provides a sealed environment for the reagents in the vessel. For example the upper portion may consist of a cap or lid or an adhesive or heat-sealed film. During the course of a reaction, and in particular when the reagents are heated, it is advantageous to provide for force to be applied to the upper portion in order to retain the integrity of the seal. This helps to prevent lids or caps from being forced out against a mechanical clip fit mechanism, and reduces deformation of sealing films by preventing them forming a "bubble". In addition, the force can improve seating of the lower portion of the receptacle into the well in the thermal mount.

Where vessels contain a volatile substance, for example water or another solvent, and where the lower portion of the vessel is subject to temperature variation, the volatile substance may evaporate, and can then recondense against the upper portion of the vessel. This can produce undesirable changes in the concentration of the reagents in solution, as well as obstructing optical access through the upper portion of the vessel and carrying thermal energy from the reagents to the upper portion of the vessel. This can be mitigated by providing a heated surface in contact with the upper portion of the vessel, thus inhibiting condensation against it. This may be the same surface that provides force on the upper portion to assist in sealing. This surface is often referred to as a heated lid.

In another aspect of the invention, a heated lid can include a compressible layer, for example a foam layer, in order to provide the required downwards force on the upper portion of the receptacles. Such a layer has significant advantages over previous means of providing the sealing force.

For example, a known arrangement is to provide for a heated lid plate which is connected to a support structure (for example an outer cover), and where springs are arranged so as to be compressed by a controlled distance, hence producing a known force on the heated lid plate. However in such an arrangement, there is a requirement for additional mechanical elements to retain the heated lid plate when the heated lid plate is not in contact with the receptacle vessels, and to constrain the movement of the heated lid so that it remains centered on the vessels (for example so that it may only move significantly in the vertical axis when closed). In order to provide for force to be applied evenly between vessels, multiple springs are often used.

However, by using a compressible layer such as a foam layer, in accordance with an embodiment of the invention as best shown in FIG. 4, a heated lid 22 can be produced with a much simpler laminar structure, consisting of an outer cover 42, an optional thermally insulating layer 96, a heated lid plate 44, and a foam layer 46 between them. The foam layer 46 provides a known pressure across the heated lid 22, and so an even distribution of force, when compressed by a controlled distance, and in addition it prevents significant lateral movement of the heated lid plate 44 relative to the outer cover 42. The optional thermally insulating layer 96 provides support for the laminar structure, and the surrounds of the heated lid 22 so as to reduce heat loss.

The foam used should be chosen to withstand multiple compression cycles, and to provide for the correct force to be applied at the expected operating temperature, which may be for example 95-110 C for use with PCR instruments. This can be achieved by use of a carefully chosen foam material, for example a polymer foam, in particular a silicone foam, with a controlled structure, in particular a closed-cell structure, for example Bisco Silicone closed cell foam BF-2005.

The heated lid plate 44 can be constructed from a further laminar structure, having a laminar resistive heater layer 48 applied to the upper surface of a thermally conductive plate 50, where the resistive heater layer 48 may be a flexible PCB incorporating a copper, NiChrome or other resistive element, and an electrically insulating encapsulation, for example a polyimide layer. The laminar structure incorporating the foam layer 46 can be assembled using adhesive to bond the foam layer 46 to the outer cover 42 and the heated lid plate 44, for example 3M double sided tape 9731.

Furthermore, known heated lids are hinged at one side, with the electrical connections passing through the hinge area. However, closing a hinged lid means that the vessels 12 nearer the hinge are contacted first and have greater force put upon them, than vessels further away from the hinge. Accordingly, in an embodiment, the heated lid is made fully removable, so that it can be located and mounted to the rest of the apparatus in a substantially axial direction (vertically). The heated lid 22 and the rest of the apparatus are provided with complementary bayonet fittings 66, so that the lid can be pushed down and then partially rotated to lock it into position.

In an embodiment, the apparatus 10 provides for use of light waveguides 38 to guide light emitted from receptacle vessels 12 to one or more light sensors 52, which may be mounted on a printed circuit board (pcb) 54. Such light sensors 52 may be of several types, for example individual sensors such as photodiodes which produce a single channel of measurement as an output voltage, current or digital signal such as a frequency or a data stream, or may provide for multiple channels of measurement, for example having multiple elements sensitive to different wavelengths of light producing multiple channels of measurement as outputs of the types listed earlier, or may have an array of light sensitive elements so as to produce a measurement of light at multiple positions across the sensor, or at multiple colours, or both, such as an image sensor.

In the case of a sensor 52 that provides for measurement of a single channel or multiple wavelengths of light, it may be optically coupled to a single fibre 38, to produce measurements of light from a single receptacle vessel 12. Where a sensor 52 provides for measurement at more than one position across the sensor, for example in the case of a monochromatic or colour image sensor, it may be optically coupled to more than one fibre, to produce measurements of multiple receptacle vessels using multiple sensing elements. In this case the optical coupling may be achieved by arranging the fibres 38 so that their light emitting ends can be imaged onto the active area of the image sensor, for example imaging a planar array of fibre ends via a lens or lens array.

In one embodiment, the invention also provides for the optical coupling to be achieved by arranging the light emitting ends of the fibres 38 in an array over an active surface of the sensor 52. Ends of the fibres 38 may be arranged in direct contact with the light sensing elements of the array, or may be spaced away from the light sensing elements, in particular where the light sensing elements are encapsulated, for example in an electronic package with a transparent cover as is the case for many image sensors, e.g. CMOS and CCD image sensors. A power cable 138 is also shown in FIG. 1 passing to a power connector 140 mounted on a lower side of pcb 54.

Figure 12:
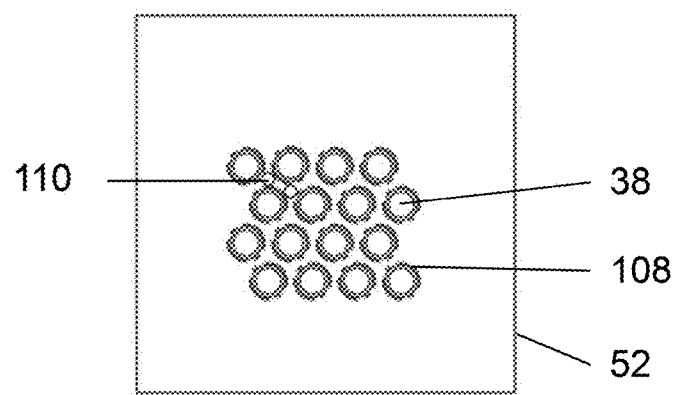
FIG. 12 shows a fibre array used in the apparatus of FIG. 1.

As shown in FIG. 12, it is desirable for the light emitted from each fibre 38 to fall on the sensor 52 in such a way that the contribution from each fibre 38 can be distinguished—each light sensing element may receive a known proportion of light from multiple fibres 38, and the known proportions can be used to recover the level of light from each fibre 38, using for example matrix deconvolution or other standard methods of deconvolution. Preferably, the arrangement is such that there are light sensing elements where a large majority of the light incident on a particular subset of light sensing elements is from a particular fibre 38, so that those light sensing elements produce readings that correspond with little or no correction to the quantity of light emitted from the corresponding fibre 38. This can be achieved by arranging the fibres 38 so that each emits light onto a region 108 of the image sensor 52, and where the regions are arranged so that they do not completely overlap. Preferably a hexagonal arrangement of regions is used to provide for the most efficient use of space, alternatively a rectangular or other arrangement may be used, for example to fit better into the active area of the particular image sensor used. Preferably there are in addition regions 110 of the image sensor active area, for each fibre 38, where there is substantially reduced light incident from the corresponding fibre 38, and no significant light from any other fibre 38, and such regions 110 are used to provide a "dark level" for the image sensor reading, which may be subtracted from or otherwise used to correct the readings taken from the areas with significant incident light from the corresponding fibre 38 (the "light level") in order to reduce the effect of thermal and other dark signal. The dark levels extracted in this way may be used to correct the light levels for the same acquisition or image, or may alternatively be used singly or in combination with the dark levels from other acquisitions or images to correct the light levels for one or more acquisitions, in particular the dark levels from multiple images taken at points relatively close in time may be combined to create a smoothed or filtered dark level for each image, in order to provide a better signal to noise for readings of a dark level that changes slowly with time, as is the case for an image sensor with a slowly varying temperature.

In particular the regions 110 used for the dark level may each form an annulus around the corresponding circular region in which the light level is extracted for the corresponding fibre. The regions 110 used for the dark level may also be regions arranged between the regions used for the light level, with one or more such regions being used for the dark level for each fibre, in particular the dark level regions 110 may be circular regions arranged with their centers at the maximum distance from the circular light level regions, within the array of light level regions. The arrangement of regions can be formed by passing the fibres through a plate with an appropriate array of holes, preferably fixing the fibres in place in this array. The plate can be constructed from an opaque and non-reflective material to reduce scattering of light. This plate can also be provided with features to align to the image sensor, either directly or via features on a pcb to which the image sensor is soldered, preferably forming a light tight seal around the image sensor to exclude ambient light.

Preferably the fibres 38 are arranged such that they form a hexagonal arrangement on the sensor 52, where the light level regions 108 are circles centered on the positions of the fibre ends above the image sensor 52, and the dark level region for each light level region consists of two circular regions 110, where the sum of the areas of the two dark level regions is the same as the area of the light level region 108, and where for each light level region 108 the corresponding dark level regions 110 have centers at two of the points midway between the corresponding light region center 108 and a neighbouring light region center 108.

The heat sink 18, attached to the thermal mount 164 (or mount plate) with the fins 32 defines an internal space 5, within which the pcb 54 and all the relevant electronics are arranged, i.e. the emitting light source 62, the light sensor 52 and the light waveguides 38, 60. This allows for a compact instrument reducing use of valuable space in a laboratory environment, and also reducing manufacturing and shipping costs.

The interior space 5 may comprise an upper boundary defined by a lower surface of the body of the first heat sink 18, on which the thermoelectric module 16 is mounted, and one or more side boundaries defined by inner edges of the thermally conductive fins 32 of the first heat sink 18. The second heat sink 20 may also be used to form a boundary (for example a lower boundary) of the interior space 5 and, in some cases, inner edges of the fins 88 of the second heat sink 20 may also be used to define the side boundaries of the interior space 5. Furthermore, the body and upper edges of the fins 32 of the upper heat sink 18 may define a second interior space 15, in which the thermal mount 14 and thermoelectric module 16 are located. In such an embodiment, substantially all the functional components (other than a power cable and the lid) of the apparatus could be located within a lateral perimeter of the apparatus defined by the outer edges of the fins of the first heat sink and, in some cases, the second heat sink, so that the apparatus produces a small footprint on a workspace.

An aspect of the invention provides for such an arrangement by use of individual focusing elements, for example lenses such as ball or half ball lenses, arranged over the emitting ends of the fibres 38, so as to guide the emitted light to a smaller region of the image sensor 52. This permits for the fibres 38 to be placed closer together without increasing the overlapping of the regions of emitted light on the sensor 52.

Figure 11:
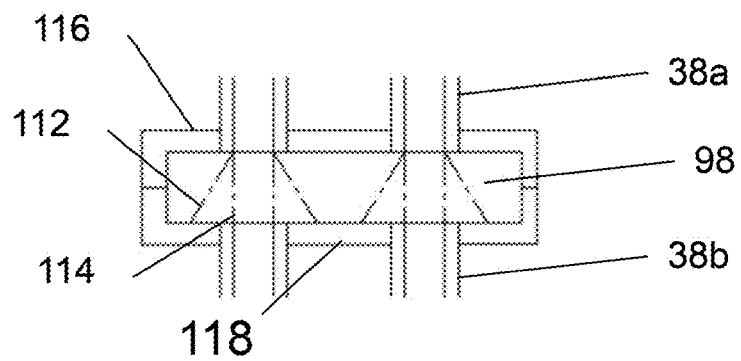
FIG. 11 shows a schematic view of the structure used for filtering light in a light waveguide in the apparatus of FIG. 1.

Alternatively, as best shown in FIG. 11, another aspect of the invention provides for the light waveguides 38 to be formed from two shorter light waveguide sections 38a and 38b, arranged so that light is emitted from the vessels 12 into the first end of a first section 38a of the corresponding waveguide 38, and is then emitted from the second end of that first section in a cone at a fairly broad angle as shown by the angled dashed lines 112, before entering the first end of a second section 38b of the waveguide 38, then finally emitted from the second end of the second section 38b of the waveguide 38 onto the sensor 52. By altering the spacing between the second end of the first section 38a and the first end of the second section 38b, preferably with these two ends being aligned to the same axis, only light at a limited angular range, as shown by vertical dashed lines 114 will be accepted by the second section 38*b*, so that (for example) any rays emitted from the edges of the first section 38*a* are only accepted if they are at a narrower angle. This in turn reduces the angular range of light emitted from the second section 38*b* to the sensor 52, and the size of the region of the sensor 52 this light is incident on. This again permits for fibres 38 to be placed closer together without increasing the overlapping of the regions of emitted light on the sensor 52.

It is particularly advantageous to use this arrangement when there is a requirement to filter the light received from the vessels 12, in particular to allow for removal of excitation light. In this case the filter 98, for example an absorption filter or dichroic filter, may be positioned between the two sections of the waveguide 38. Preferably, the instrument incorporates multiple waveguides 38, where each receptacle is provided with at least one waveguide 38, and a planar array of second ends of the first sections 38*a* of each waveguide 38 is formed by fixing the waveguide ends into a first retaining plate 116, another planar array of the first ends of the second sections 38*b* of each waveguide 38 is formed by fixing the waveguide ends into a second retaining plate 118, where the two arrays formed are such that when they are placed on opposing faces of a planar optical filter 98, each end in the first plate 116 is opposite an end in the second plate 118, and where the plates are designed to hold the filter 98 in place and provide a light tight enclosure. Preferably, the filter 98 is a dichroic filter. The apparatus may alternatively or additionally include a filter wheel, linear array or 2D array (such as a grid) carrying multiple filters, which can be translated and/or rotated to position any of those filters between the first and second sections of the light waveguides.

A further set of light waveguides 60 are used to guide excitation light from an excitation light source on the pcb 54 to each vessel 12 and may also be constructed in a similar manner, where each waveguide 60 has two sections with a filter, filter wheel, linear array or 2D array of filters between the sections, in order to provide for filtering of the excitation wavelength. In this case the same filter wheel or array may be used for both excitation and emission filters, where corresponding pairs of excitation and emission filters are arranged at a fixed separation in the filter wheel or array, and the waveguides are arranged at a corresponding separation, such that as the filter wheel or array translates or rotates, it aligns successive pairs of excitation and emission filters with the excitation and emission waveguides.

The previously described arrangements of light waveguides 38 for guiding emitted light from each vessel 12 to corresponding light sensors, or positions on a single light sensor 52, may also be used in parallel, so that each vessel 12 has multiple light waveguides provided to guide portions of the light emitted from the vessel 12 to different sensors. Such sensors could, for example, be sensitive to different wavelengths of light, for example intrinsically or as a result of filters in the light path, or could provide an extended dynamic range by measuring light with different sensitivity or gain settings.

Similarly, the previously described arrangements of light waveguides 60 for guiding excitation light to each receptacle vessel 12 from corresponding excitation light source(s) 62, may also be used in parallel, so that each vessel 12 has multiple light waveguides 60 providing excitation light from distinct excitation light sources. Such light sources could be chosen for example to provide excitation light at different wavelengths, and could be enabled and disabled individually to vary the provided excitation light spectrum for each vessel 12. Where light sensors are provided with different responses to different wavelengths of light, or excitation light is provided at different wavelengths, or both, the measurements with different excitation light wavelengths and/or at different wavelengths of light from the same vessel 12 may be used to derive the quantities or activity of one or more substances in the reactions, by deconvoluting the measurements. This deconvolution may be by means of a matrix deconvolution, including multiplication by an inverse or pseudo-inverse matrix of known substance emissions, principle component analysis, non-negative least-squares deconvolution, or similar techniques.

In order to provide for vessels 12 to be loaded with reagents, for example tubes or strips of tubes, physical access to the vessels 12 can be provided by allowing for the heated lid 22 to move relative to the vessels 12, clearing access to the vessels 12. As mentioned above, according to one embodiment, this can be achieved by translating, rotating or translating and rotating the heated lid 22 using a bayonet fitting 66 to lock the lid in place. This can be achieved by active mechanical means such as a motorised system, or by allowing the user to move the heated lid manually. The heated lid 22 will very often be electrically controlled, using resistive or other electrical heating elements and one or more electronic temperature sensors.

In order to permit movement of the heated lid 22 relative to the vessels 12 while allowing for electrical connections to the heating elements 48 and temperature sensors in the lid, a flexible electrical connection (for example a flexible pcb, or flexible wiring or cables), is provided with an electrical connector for heated lid 22 that can be disconnected as the lid 22 is removed.

One embodiment of the apparatus according to the invention provides a rotatable connector to provide power and data connections to heated lid 22 permitting it to be operated in various ways, for example, using only three distinct electrical connections 68, 70, 72. These connections 68, 70, 72 are configured as an electrical ground, a data line, and a power line. In a system with a flexible electrical connection, use of only three connections allows for increased reliability since flexible connections can be prone to failure due to repeated movement, as well as permitting a more compact and cost effective connection. In a system with a removable lid 22, the use of three connections enables use of a wider range of connectors, and also decreases cost and increases reliability, due to the requirement for fewer fault-prone electrical connections. In particular, this enables the use of connectors capable of rotation of the two connected elements around an axis.

Accordingly, in one embodiment, a tri-axial connector 74 is used, which permits three connections 68, 70, 72 by providing a jack 76 with two concentric cylindrical contacts on the inner and outer faces of a cylindrical outer wall 78, and a further contact in the form of a pin 80 at the axis of the cylindrical contacts, and a mating socket 82 having a cylindrical slot 84 for the cylindrical outer wall 78, containing spring contacts to connect to the two cylindrical contacts of the jack 76, and a further central aperture 86 to accept the jack's pin 80 and provide an electrical contact via further spring contacts. Other connectors are also suitable for use in such a system, for example using jacks with multiple substantially cylindrical contacts arranged along a single axis, optionally having a final contact forming the tip of the jack, and a corresponding socket with an aperture having spring contacts arranged to form connections to these contacts.

Use of a rotatable connector 74 allows for easier connection of a detachable heated lid 22 by allowing the lid 22 to be closed at different angles. In addition it enables the lid to be fixed into place using a bayonet or screw mechanism, removing the need for a separate means of securing the lid. A bayonet mechanism 66, which may form part of the thermally insulating layer 96 allows for the lid 22 to be fitted by pushing the lid 22 along the axis of the rotatable connector 74 to form the electrical connection and press the heated lid plate 50 against the seal on the top of the receptacle vessels 12, and then rotating the lid 22 around the same axis to allow for features on the lid 22 and the body of the apparatus to mate and hence secure the lid 22. The lid 22 is removed by reversing this process, rotating the lid 22 and then removing it along the connector axis. The design of a heated lid plate 50 for use in such a system preferably provides a smooth, low friction surface to allow for the plate 50 to rotate while in contact with the seals of the vessels 12. For example this can be achieved using a smooth metal surface, for example a turned component. In addition, the surface may be plated or coated, for example with nickel or PTFE.

The apparatus provides for several modes of operation of a lid with three connections. In a preferred embodiment, the lid 22 contains a resistive heating element 48 connected between the ground and power lines and arranged to heat the heated lid plate 50, and a temperature sensor capable of operating in a parasitic power mode connected between the data line and ground, and arranged to sense the temperature of the heated lid plate 50. Such a sensor can derive power for its operation from the data line used to communicate with the sensor. Examples include Dallas/Maxim 1-wire temperature sensors such as the MAX31826 or any of a number of similar devices. The apparatus provides a permanent resistive pull-up on the data line, to a suitable voltage for use with the device, for example 3.3V, and in addition can read the voltage of the data line, and can pull it to ground. The apparatus can then implement communication with the temperature sensor by use of a communication protocol compatible with the 1-wire device. Preferably, the apparatus also provides a switchable string pull up to the data line voltage, which is enabled during operation to provide additional power to the 1-wire device, for example during temperature conversion operations. Preferably, the apparatus uses a microcontroller with a UART, USART or other serial communication controller operating in open-drain mode, either by software configuration or provision of external electronics to convert the peripheral to open drain operation, to implement the 1-wire compatible communication, permitting reduced cost and complexity of electronics. Alternatively, the apparatus may use a dedicated 1-wire master device such as the DS2482 1-wire master IC. The apparatus communicates with the 1-wire device in order to detect the presence of a valid lid, by querying the device to retrieve data such as serial number, device family, EEPROM contents and current temperature, and can then repeatedly query the device in order to establish that the lid is still connected, and what temperature the heated lid plate is currently at. Preferably the resistive heating element is manufactured as a flexible PCB, providing for the temperature sensor to be soldered to contacts on the PCB. The apparatus is further provided with a means of varying the power supplied to the resistive heating element via the power line, for example by measuring and/or controlling the voltage of the line, the current permitted to flow through the lid, or both. In a preferred embodiment, the apparatus is provided with a fixed voltage power supply which may be switched on and off in order to regulate the heater power. Alternatively, the apparatus incorporates a variable voltage power supply, where voltage may be increased or decreased to increase or decrease heater power. This may be further extended with a current sensor allowing for measurement and/or regulation of the heater current or total power.

By repeatedly reading the temperature of the lid and using the temperatures read to adjust the power provided to the lid over time, the apparatus may cause the temperature of the heated lid to follow a desired profile. For example in the case of a PCR reaction, the heated lid 22 may be heated to around 100° C. around the start of the reaction, and maintained at this temperature during the reaction.

In another embodiment, the heated lid 22 is further provided with a microcontroller which is powered by the power line and ground lines, and has a pin connected to the data line which is capable of communicating using an open-drain mode of operation, where the lid microcontroller may read the state of the data line, and may pull the line to ground. In this embodiment, the apparatus provides power to the lid 22 during operation to enable the lid microcontroller to run, and communicates with the lid microcontroller to provide for lid functions. It is possible to provide a temperature sensor in the lid which may be used by the lid microcontroller to measure the temperature of the heated lid plate 50, as well as means of controlling the power supplied to the heated lid resistive heater using the microcontroller, for example by providing for switching of voltage from the power line to the resistive heating element. In this mode of operation, the apparatus may query the lid microcontroller to read temperature, and provide feedback to determine the required heating power, or may simply provide a desired temperature or temperature profile to allow the heated lid microcontroller to regulate the heated lid temperature autonomously. In addition, there may be additional functions performed by such a lid, including provision of display elements such as LEDs, LCD displays, OLED displays or e-paper displays which allow for the display of information from the heated lid 22 or apparatus to the user, in particular for status display such as current type of reaction, reaction results and progress, time remaining, error or warning information, advice to the user on operation of the instrument, instrument data such as serial number or settings, etc. Further functions include reading the status of input devices, for example buttons, keypads, D-pads, microphones or capacitive sensors used by the user to configure and control the apparatus, sensors to detect the presence of receptacle tubes, additional connectors such as USB or SD card connectors, or wireless communications interfaces such as WiFi, bluetooth, or bluetooth low energy. In each case the functions can be provided directly by the heated lid microcontroller, or by the apparatus controlling the function using communication on the data line.

The data line can be used to improve the safety of the apparatus, by ensuring that power is not provided to the power line until the apparatus has successfully identified the presence of a valid connected lid by communication with a parasitically powered device connected to the data line in the attached lid 22. This can prevent potential hazards arising from providing a voltage to the power line when it may be accessible to the user, or may have an electrical short, for example due to a user's attempt to insert something other than a valid lid. In addition, the lid may contain devices carrying data that can be used to identify the type and configuration of a lid, allowing for suitable operation of the lid.

Where a lid is provided with a microcontroller, the lid will preferably also contain a parasitically powered device which can be used to identify the lid before power is provided to the power line, enabling the lid microcontroller to run. When the lid microcontroller is running, it may communicate with the apparatus via an alternate protocol, for example using a standard open-drain UART protocol rather than a 1-wire compatible protocol, giving improved data rates. An advantage of this embodiment is that any 1-wire devices also attached to the data line will not interfere with UART communications, provided the UART baud rate is high enough to avoid generating a valid 1-wire reset pulse, for example by operating at 115200 baud or more.

Preferably the apparatus is provided with a microcontroller using a UART or other serial controller as described, enabling the use of lids of the types described above to be used interchangeably without requiring modifications to the apparatus.

As described earlier, use of a thermoelectric module 16 for controlling the temperature of the vessels 12, for example by controlling the temperature of a thermal mount 14 including the vessels 12, often involves the use of a heat sink 18, where the thermoelectric module 16 is thermally coupled on one side to the thermal mount 14 or vessels 12, and on the other side to the heat sink 18. In this case, the heat sink 18 functions as a source of thermal energy to be pumped to the vessels 12 when heating them, and as a sink for thermal energy to be pumped from the vessels 12 when cooling them. In addition, the heat sink 18 acts as a sink for heat produced by resistive heating in the thermoelectric module 16 during operation. As a result, the heat sink 18 should receive or dissipate heat from or to the ambient environment of the apparatus, in order to keep the temperature of the heat sink 18 within a suitable operating range.

A thermal sensor 104 may also be provided in the thermal mount 14 and connected to the pcb 54 in order to allow the temperature of the mount to be used by the microcontroller to correctly control the thermoelectric module 16, for example by controlling the current over power line 106 to cause heating and cooling of the thermoelectric module 16 according to the direction of current flow.

By providing a heat sink 18 having fins 32 or other high-surface-area features on its surfaces, it is possible to provide for efficient coupling of the heat sink 18 to the ambient environment. In particular, an extruded heat sink 18 with fins can be conveniently manufactured and provide good performance, enabling features such as operation with only passive convective, conductive and radiative transfer of heat, without the requirement for forced air-flow, for example using a fan. Such a heat sink 18 may also be manufactured in a rotationally symmetric form as described earlier, allowing for increased temperature uniformity. Additionally, a heat sink may be manufactured with a central, axial void allowing the heat sink 18 to be used as the body of the apparatus 10. Preferably, the heat sink 18 is manufactured from a thermally conductive material such as a metal, for example copper and/or aluminium, or an alloy designed for high thermal conductivity, such as aluminium alloy 6082-T6 or 6063-T6. Of these, the 6082 alloy provides for improved mechanical properties, whereas the 6063 provides for high thermal conductivity, which is beneficial to the performance of the heat sink, and also to other components in the thermal system such as the mount and any thermal couplings, or the heated plate in the heated lid.

Although the thermoelectric module 16 is a significant source of heat in the system, particularly while the vessels 12 are held at a high temperature, or are being rapidly heated or cooled, there are also significant heat sources in the electronics of a typical apparatus, for example in power electronics used to provide current to the thermoelectric module 16 and any other heating elements 48 such as those used in the heated lid 22, as well as the excitation light source 52 such as LEDs, lamps etc., and other electronic components such as power/voltage regulators, microcontrollers, etc. Typically, the electronic components are sensitive to variations in temperature, and are only specified for use in a limited range of temperatures. In particular, components used for measurement and signal conversion are sensitive to temperature variations, which can cause inaccurate or variable measurement, introduce additional noise to measurements, and have other undesirable effects on the utility of measurements produced by the components. For example, analogue to digital conversion devices used for measurement of temperature via connected sensors such as thermocouples, thermopiles, thermistors or other resistive temperature sensors such as platinum or other RTDs may produce a lower signal to noise ratio at elevated temperatures, and may also suffer from "drift", where the temperature reported for the sensor is also influenced by the temperature of the device and associated components such as resistors, etc. Electronic image sensors also exhibit effects such as dark current, where a signal is produced by the sensor in the absence of light, which increases with increased temperature.

In order to remove heat from the electronic components of the apparatus 10, the components and/or the printed circuit board(s) 54 on which they are mounted may be thermally coupled to one or more heat sinks. In particular, the components and/or pcb 54 may be coupled to the same heat sink 18 that is coupled to the thermoelectric module 16, to reduce the number of components, cost and complexity of the apparatus. However, in one embodiment of the invention, it is also possible to couple the components and/or pcb 54 to a second heat sink 20, which can then be designed to operate at a lower temperature than the heat sink 18 coupled to the thermoelectric module 16, allowing for improved performance of the electronic components, in particular measurement components. Preferably, the same extrusion cross-section can be used to form both the thermoelectric module heat sink 18 and the electronics heat sink 20, which has radial fins 88, where two sections of the heat sink extrusion can be arranged on the same axis, with the thermoelectric module 16 coupled to the first heat sink 18, the electronic components/pcb 54 coupled to the second heat sink 20, with the two heat sinks 18, 20 being poorly thermally coupled. This can be conveniently achieved using a stacked construction, where the elements of the stack (the thermoelectric module assembly, first heat sink 18, electronics and second heat sink 20) are assembled with a thermally non-conductive element 90 between the two heat sinks 18, 20. Preferably the stack is constructed, from bottom to top, by the second heat sink 20, then a thermal coupling to the electronics pcb 54 (for example using thermal paste, a conformal layer such as graphite, a thermal adhesive, etc.), then the electronics pcb 54, then a thermally insulating layer 90, then the first heat sink 18, then a thermal coupling to the thermoelectric module assembly (for example thermal paste or other materials listed earlier). The thermoelectric module assembly includes the thermoelectric module 16 and, if necessary, a means of coupling it to the heat sink 18, such as using a thermally conductive plate. By arranging the electronics heat sink 20 under the thermoelectric module heat sink 18, cooler ambient air is drawn by convection over the electronics heat sink 20 before the thermoelectric module heat sink 18, leading to a lower electronics heat sink temperature and improved performance.

By using a passive heat sink, where heat is transferred to and from the heat sink from the ambient environment without the use of a fan to provide forced air flow, the mechanical reliability may be improved due to the reduction in fallible moving parts, cost may be reduced, and the reliability, maintenance requirements and performance of the apparatus in general may be improved by avoiding contamination of the apparatus by contaminants (dust etc.) in a fan-cooled system.

By using of more than one separate heat sink, the relative sizes of the heat sinks can be adjusted in order to provide a thermal rating in each heat sink that is appropriate to the power dissipation and operating temperature delta above ambient required by the attached components. For example it is possible to provide a larger heat sink for the thermoelectric module and a smaller one for the electronics, in the case where, for example, the thermoelectric module needs to dissipate more power than the electronics.

It is also possible to provide for air to be forced over the heat sinks 18, 20 described earlier, for example by providing a fan or other means of moving air over the heat sinks 18, 20, including for example ducted airflow systems etc. in order to improve the thermal rating of the heat sinks.

As described earlier, many electronic components of the apparatus may generate significant heat during operation, and so preferably the apparatus will mount such components on a pcb 54 designed to provide for good thermal coupling of such components to the heat sink 20. Preferably the components will be mounted close to the heat sink 20. Preferably the pcb 54 will provide a high thermal conductivity to the area of coupling from the pcb 54 to the heat sink 20, for example by providing multiple layers having copper fills linking the components to the coupling area, preferably with relatively thick copper layers. Preferably the pcb 54 will provide for conduction between the layers where components are mounted, the layers where the heat sink 20 is coupled, and the layers where heat is conducted from the components to the heat sink coupling area, by use of plated vias between layers of the pcb 54.

Where a pcb 54 contains both a set of components that generate significant heat, and a set of components that are sensitive to temperature, such as measurement components, the pcb 54 is preferably designed to thermally isolate these sets of components, for example by arranging the components to increase the distance between components in different sets, and by reducing the thermal conductivity of the pcb 54 between components in different sets, for example by reducing the copper present in the pcb between the components, and providing for foramens in the pcb 54 where an air gap will provide lower thermal conductivity than copper or the pcb substrate.

These techniques make it feasible to mount components that generate significant heat, and temperature sensitive components, on the same pcb 54 in the apparatus, while providing for acceptable performance of the temperature sensitive components. In particular this allows for a single, compact pcb 54 to provide for substantially all the electronic requirements of an apparatus 10, including temperature and optical measurement and driving of heating elements and/or the thermoelectric module 16, giving advantages in terms of apparatus size, reliability, cost and complexity.

Preferably such a single pcb 54 includes a single microcontroller providing for all control, interface and measurement functions of the apparatus 10. In particular, this microcontroller may manage reading the temperature of the vessels 10 and the heated lid 22, running control algorithms to produce desired output levels for the heating elements and/or the thermoelectric module 16 controlling the temperature of the vessels 12 and the heated lid 22, producing those output levels, regulating the vessels 12 and the heated lid 22 to the desired temperature profile, reading optical measurements from one or more light sensors 52, storing measurement data, providing data interfaces such as ethernet, serial and wireless interfaces, driving display devices such as LEDs, LCD, OLED and e-paper displays, producing audio notifications, etc. This allows for the apparatus 10 to have reduced cost and complexity and increased reliability compared to an apparatus comprising multiple microcontrollers, as found in existing instruments such as PCR instruments. The microcontroller may provide these functions by use of a real-time operating system.

While the use of a single pcb may be advantageous for the reasons described, the apparatus may also contain multiple pcbs. In this case the advantages of compact integration of components as described still apply to the individual pcbs in the apparatus. For example, it may be useful to combine heat generating and temperature sensitive components on a single main pcb, whilst still also using additional pcbs for other functions. In general the apparatus may also include multiple pcbs in other arrangements.

The apparatus may include electronics and/or connections allowing for the apparatus to be configured, controlled and/or monitored by an external device such as a computer (PC, Macintosh, etc.), tablet, phone etc. Such control could include configuring parameters or settings of the apparatus or reactions, including temperature profiles, optical settings, timings, etc., receiving generated data such as temperature readings, optical data, errors and warnings, progress and status information from the apparatus, either in real-time as the data is generated or as a batch, monitoring the status of the instrument, performing servicing and diagnostics, etc. Such electronics may allow for the external device to be connected by wired connections such as serial connections, network connections such as Ethernet using TCP/IP or other protocols, or by wireless connections such as radio connections including Bluetooth, Bluetooth low energy, WiFi, NFC, cellular data connections such as GPRS, 3G, 4G, etc. or other wireless connections including infra-red communications or other light-based connections.

Where a microcontroller is included in the apparatus, this may also be used to facilitate operation with an external device as described previously.

In instruments providing for optical excitation of a sample, for example in fluorimeters and in particular PCR instruments, the intensity of light emitted from a reaction is dependent on the intensity of provided excitation light, often being directly proportional to the excitation intensity. In such instruments, it is important to provide for a known intensity of excitation light, or alternatively for a known total amount of excitation light during a measurement over a period of time. Any variation in the excitation light will be reflected in a variation of emitted light, and so unless the variation in excitation light is either eliminated, or is known so that it can be corrected for, it will degrade the quality of measurements taken.

Figure 13:
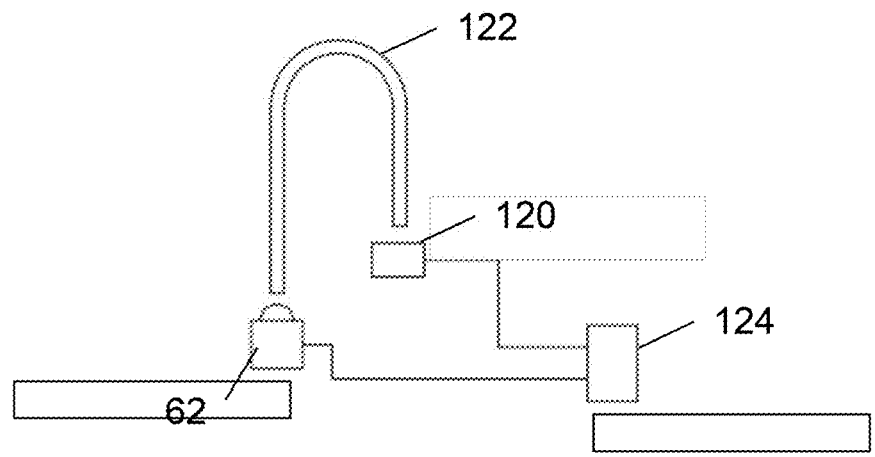
FIG. 13 shows an LED and sensor arrangement used in the apparatus of FIG. 1.

As shown in FIG. 13, an embodiment of the invention provides for a convenient, accurate and inexpensive means of providing for a known total amount of excitation light to be provided to the reaction during a measurement of emitted light. This is achieved by use of an excitation light sensor 120 providing an electronic digital frequency output proportional to the intensity of light incident on the sensor, where a portion of the excitation light from the excitation light source 62 is directed to that sensor 120 using, for example, an optical waveguide 122, and where the frequency output of the sensor is connected to an input pin of a microcontroller 124, and where an output pin of the microcontroller is connected to the excitation light source 62 that is gated by the state of the pin, such that the microcontroller 124 may set the pin state to enable or disable the production of excitation light by the excitation light source 62. The microcontroller 124 is configured such that it may produce a pulse of light with a known total amount of light, by first enabling the excitation source, and then counting the pulses emitted by the frequency output of the light sensor until a predetermined pulse count is reached, at which point the microcontroller 124 disables the light source 62. Since the frequency of the light sensor output is proportional to the intensity (or power, photons per second etc.) of the light source 62, the count produced during a light pulse is proportional to the amount of light in that pulse (energy, number of photons, etc.). Since the excitation light energy is fixed, the emitted light energy is a direct measure of the reaction, which does not require ratiometric correction. However it is also possible to derive or measure the relationship between the number of pulses emitted by the frequency output of the light sensor, and the energy, photon count etc. of the excitation light, and so use this excitation amount to produce an absolute measurement of fluorescence.

In particular, use of a timer/counter peripheral(s) of a microcontroller 124 to count the output pulses of the light sensor 62 allows for implementation of such a system. By using a common peripheral, this enables use of common, cost-effective microcontrollers without the requirement for additional components. This system also allows for high accuracy, by using the timer/count peripheral(s) to control the process with reduced need for intervention from the microcontroller core, reducing jitter, inaccuracy, and demands on the microcontroller core. Preferably the microcontroller provides a timer/counter with a "one pulse" mode of operation, where the timer/counter may be configured such that the enable output to the excitation light source will be disabled when the desired count has been reached, without any intervention at all from the microcontroller core, enabling the best accuracy and minimal demands on the microcontroller core. Such peripherals are provided by microcontrollers such as STM32FX parts provided by ST Microelectronics, for example the STM32F4 microcontroller family, including the SFM32F407, STM32F427, etc.

An embodiment of the invention provides a means of arranging for excitation light from an LED to be coupled to an array of light waveguides 60, such as optical fibres, for example glass or polymer fibre optics. The apparatus comprises an LED 62, such as a Philips LUXEON Rebel LED, a collimation lens 64, an optical filter 100 and an array of light waveguide ends. The collimation lens 64 is adjacent to the LED 62, and efficiently collects and collimates the light, which is then directed through the filter 100 adjacent to the lens 64, and hence into the ends of the waveguides 60 adjacent to the filter 100. The lens 64, filter 100 and array of light waveguide ends are held in an enclosure 102 to provide a fixed spacing of the components for optimal operation. Preferably the collimation lens 64 is a ball or half-ball lens, although many other lens types are also suitable. This arrangement provides for a compact, cost effective excitation system capable of uniform illumination of the light waveguide ends.

The apparatus 10 also provides for the communication of information to a user of the apparatus, in one embodiment, in particular communicating status such as the beginning, progress and end of reactions, current type of reaction, reaction results, time remaining, error or warning information, advice to the user on operation of the instrument, instrument data such as serial number or settings, etc. In particular this information may be conveyed by audible and/or tactile signals such as sound and/or vibration, including sounds and/or speech, and/or visible displays such as LEDs 126 including RGB LEDs, LCD displays, OLED displays or e-paper displays. In particular, LED displays 126 may use light guides to conduct the displayed light from the LEDs 126 to a user display region. As shown in FIG. 1, the light guides may be formed by a cylindrical Perspex structure 128 having an upper edge adjacent the LEDs 126, a chamfered lower edge 130 to reflect the light at 90°, and an annular Perspex structure 132 having an inner edge adjacent the chamfered lower edge 130 of structure 128 to receive the reflected light and an outer edge through which the light may be emitted to be seen by the user.

It will be appreciated that although only a few particular embodiments of the invention have been described in detail, various modifications and improvements can be made by a person skilled in the art without departing from the scope of the present invention. For example, several of the described embodiments allow for an apparatus with sixteen receptacles with a low electrical power consumption of around 90 W, however other embodiments with larger numbers of wells and/or higher power consumption may also be envisaged, and in larger apparatus.

The invention claimed is:

1. An apparatus for receiving a plurality of reaction vessels in which chemical and/or biochemical reactions may take place, the apparatus comprising:
    a thermal mount of a thermally conductive material, the thermal mount having a plurality of wells for receiving the reaction vessels;
    a thermal module having a first side thermally coupled to the thermal mount and a second side;
    a first heat sink thermally coupled to the second side of the thermal module, the heat sink comprising a body and a plurality of thermally conductive fins extending outwards from the body of the first heat sink;
    at least one printed circuit board comprising electronic components for controlling at least the thermal module, at least one excitation light source, and at least one light sensor;
    a first plurality of light waveguides, each having a first end for receiving excitation light from the at least one excitation light source and a second end for delivering the excitation light to a reaction vessel when it is positioned in a respective well; and
    a second plurality of light waveguides, each having a first end for receiving light from a reaction vessel when it is positioned in a respective well and a second end for delivering the light to the at least one light sensor;
    wherein the first heat sink comprises an interior space at least partly defined by the plurality of thermally conductive fins, and wherein the at least one printed circuit board, the excitation light source, the light sensor and the light waveguides are arranged within the interior space.

2. The apparatus of claim 1, wherein the at least one printed circuit board is substantially thermally insulated from the first heat sink and wherein the apparatus comprises a second heat sink thermally coupled to the at least one printed circuit board, said second heat sink having a plurality of thermally conductive fins extending outwards from a central portion of the second heat sink.

3. The apparatus of claim 1, wherein the thermal module is any one of:
 a thermoelectric module;
 a resistive heater; or
 a thermal heater with heating and cooling provided by liquid of different temperatures.

4. The apparatus of claim 1, the apparatus comprising:
 a lid comprising an outer cover, an inner thermally conductive layer for contacting a top seal of the reaction vessels when they are positioned in the plurality of wells and the lid is in a closed position, one or more heating elements for heating the inner thermally conductive layer, and a locking structure for locking the lid in the closed position;
 wherein the electronic components of the at least one printed circuit board are further for controlling the one or more heating elements; and
 a rotatable electrical connection coupled between the at least one printed circuit board and the lid, wherein the rotatable connection provides a power connection and/or a data connection between the at least one printed circuit board and the lid.

5. The apparatus of claim 4, wherein the rotatable connection provides the power connection and the data connection between the at least one printed circuit board and the lid, wherein the data connection comprises at least one of:
 a data connection between the at least one printed circuit board and at least one temperature sensor in the lid;
 a data connection between the at least one printed circuit board and a sensor that determines whether the lid is in the closed position;
 a data connection between the at least one printed circuit board and a microcontroller in the lid, wherein the microcontroller is configured to perform one or more of:
  regulating temperature of the lid by reading a temperature sensor and controlling the power connection providing power to the one or more heating elements of the lid;
  controlling one or more display elements in the lid, which display elements comprise one or more of:
   display LEDs;
   LCD display;
   OLED display; and
   e-paper display;
  reading a status of one or more human input devices;
  providing an interface to additional connectors in the lid; and
  providing an interface to wireless communications electronics in the lid;
 a data connection between the at least one printed circuit board and at least one 1-wire slave device in the lid, the at least one 1-wire slave device being connected to the data connection and configured so that it can be parasitically powered by the data connection;
 a data connection between the at least one printed circuit board and non-volatile data storage in the lid, wherein the non-volatile data storage is used to store data that is used to identify type, version, manufacturing date, revision and/or calibration data associated with the lid;
 a data connection that is resistively pulled to a voltage, and the lid and the at least one printed circuit board each include an electronic device having an open-drain output pin connected to the data connection, thereby allowing each electronic device to pull the data connection to ground to transmit data, and to sample the state of the data connection to receive data; and
 a data connection comprising a standard UART connection configured to operate in open-drain mode to provide for transmission and reception of data.

6. The apparatus of claim 4, wherein the lid is positionable into the closed position in a direction to contact all the top seals of the reaction vessels when they are positioned in the plurality of vessels substantially simultaneously.

7. The apparatus of claim 4, wherein the lid has a laminar structure including a compressible layer arranged between the inner thermally conductive layer and the outer cover to bias the inner thermally conductive layer against the top seals of the reaction vessels when the lid is in the closed position.

8. The apparatus of claim 7, wherein the compressible layer of the lid is a foam.

9. The apparatus of claim 1, wherein the second ends of the light waveguides are mounted directly to the at least one light sensor.

10. The apparatus of claim 1, the apparatus comprising:
 wherein the plurality of thermally conductive fins extend radially outwards from a central portion of the first heat sink;
 wherein the at least one printed circuit board is thermally insulated from the first heat sink; and
 a second heat sink thermally coupled to the at least one printed circuit board, with a plurality of thermally conductive fins extending radially outwards from a central portion of the second heat sink.

11. The apparatus of claim 4, wherein the rotatable connection comprises either:
 a tri-axial connector for connection to the at least one printed circuit board, and a corresponding tri-axial connector for connection to the lid; or
 a multi-pole rotatable connector with at least three poles, wherein the multi-pole rotatable connector comprises:
  a connector with a pin and cylindrical contacts; or
  a connector with stacked cylindrical contacts; or
  a connector with more than three poles.

12. The apparatus of claim 1, wherein each of the light waveguides comprises at least two light waveguides coupled in series with a dichroic optical filter in a light path between them.

13. The apparatus of claim 1, wherein each of the light waveguides of the plurality comprises at least two light waveguides with one or more filters mounted either on a filter wheel comprising a plurality of different filters or on a filter slide comprising a plurality of different filters, the one or more filters being movable into a light path between the at least two light waveguides.

14. The apparatus of claim 13, wherein a single filter wheel is coupled such that when a first filter of the filter wheel is arranged between the waveguides of the plurality of light waveguides a predetermined second filter is arranged between the waveguides of the second plurality of light waveguides.

15. The apparatus of claim 1, further comprising one or more of a flexible, thermally conductive adhesive, graphite, a thermal paste and a thermally conducting conformal layer arranged between the thermal module and the thermal mount.

16. The apparatus of claim 1, further comprising an excitation light control system, the excitation light control system comprising an excitation light sensor providing an electronic digital frequency output proportional to an intensity of excitation light incident on the excitation light sensor, wherein the excitation light incident on the excitation light sensor comprises a portion of the excitation light emitted from the at least one excitation light source, the electronic digital frequency output of the excitation light sensor being connected to an input of a microcontroller, and wherein an output of the microcontroller is connected to the excitation light source, the excitation light source being gated by the state of the output, such that the microcontroller may set the output state to enable or disable the production of excitation light by the excitation light source, and hence provide pulses of excitation light containing a repeatable total amount of excitation light.

17. The apparatus of claim 16, wherein the electronic digital frequency output of the excitation light sensor comprises pulses and the microcontroller is configured to count the pulses produced by the excitation light sensor, and to disable the excitation light source after a desired number of pulses.

* * * * *